United States Patent
You et al.

(10) Patent No.: US 12,366,847 B2
(45) Date of Patent: Jul. 22, 2025

(54) ANOMALY EVENT DETECTOR

(71) Applicant: AspenTech Corporation, Bedford, MA (US)

(72) Inventors: Jiangsheng You, Andover, MA (US); Mikhail Noskov, Acton, MA (US)

(73) Assignee: AspenTech Corporation, Bedford, MA (US)

( * ) Notice: Subject to any disclaimer, the term of this patent is extended or adjusted under 35 U.S.C. 154(b) by 372 days.

(21) Appl. No.: 17/746,548

(22) Filed: May 17, 2022

(65) Prior Publication Data
US 2023/0376012 A1  Nov. 23, 2023

(51) Int. Cl.
*G05B 19/418* (2006.01)

(52) U.S. Cl.
CPC ..... *G05B 19/4184* (2013.01); *G05B 19/4183* (2013.01); *G05B 19/41835* (2013.01)

(58) Field of Classification Search
CPC .......... G05B 19/4184; G05B 23/02; G05B 23/0243; H04L 63/1425
See application file for complete search history.

(56) References Cited

U.S. PATENT DOCUMENTS

| | | | |
|---|---|---|---|
| 3,597,875 A | | 8/1971 | Christiansen |
| 11,604,125 B1* | | 3/2023 | Thompson ............. G01N 30/12 |
| 2016/0330225 A1* | | 11/2016 | Kroyzer ................. G06N 20/00 |
| 2019/0265688 A1* | | 8/2019 | Shahroudi .......... G05B 23/0286 |
| 2020/0143292 A1* | | 5/2020 | Huang ............... G05B 23/0243 |
| 2021/0341910 A1* | | 11/2021 | Song .................. G05B 23/0235 |
| 2022/0318618 A1* | | 10/2022 | Guntar .................. H04L 67/133 |
| 2023/0028886 A1* | | 1/2023 | Zhang .................... G06N 20/10 |
| 2023/0123527 A1* | | 4/2023 | Michael ............. G05B 23/0221 702/183 |
| 2023/0205193 A1* | | 6/2023 | Lavrentyev ........ G05B 23/0221 702/183 |
| 2023/0409756 A1* | | 12/2023 | Baldwin ............... H04L 9/0877 |

OTHER PUBLICATIONS

Anomaly detection, downloaded from Internet May 4, 2022, https://en.wikipedia.org/wiki/Anomaly_detection.
Long short-term memory, downloaded from Internet May 4, 2022, , https://en.wikipedia.org/wiki/Long_short-term_memory.
Mixture model, downloaded from Internet May 4, 2022, https://en.wikipedia.org/wiki/Mixture_model.
Mtell Asset Predictive Maintenance, downloaded from Internet May 4, 2022, https://www.aspentech.com/en/products/apm/aspen-mtell.

* cited by examiner

*Primary Examiner* — Mong-Shune Chung
(74) *Attorney, Agent, or Firm* — Hamilton, Brook, Smith & Reynolds, P.C.

(57) ABSTRACT

Embodiments are directed to a computer-based tool that can identify an anomalous state of a component in a real-world environment, even if the component experiences gradual and/or seasonal trends. The tool receives data from sensors monitoring a component. The tool uses a trained machine learning model to calculate a predicted behavior of the monitored component. Actual behavior of the component, captured by current sensor readings, is compared to the predicted behavior of the component, calculated by the machine learning model, to compute a divergence. The computed divergence is used by a statistical learning method to determine if the component in the real-world environment is in an anomalous state.

20 Claims, 22 Drawing Sheets

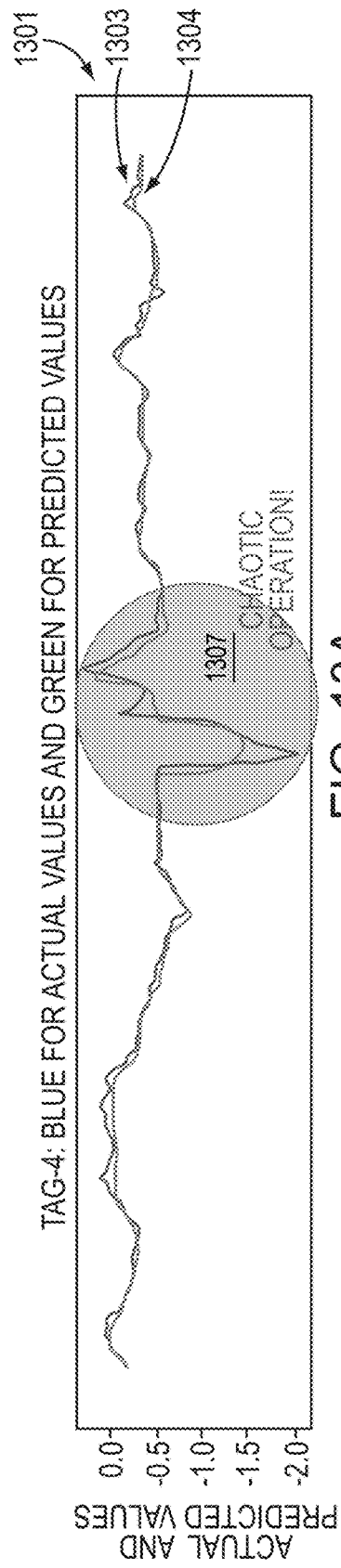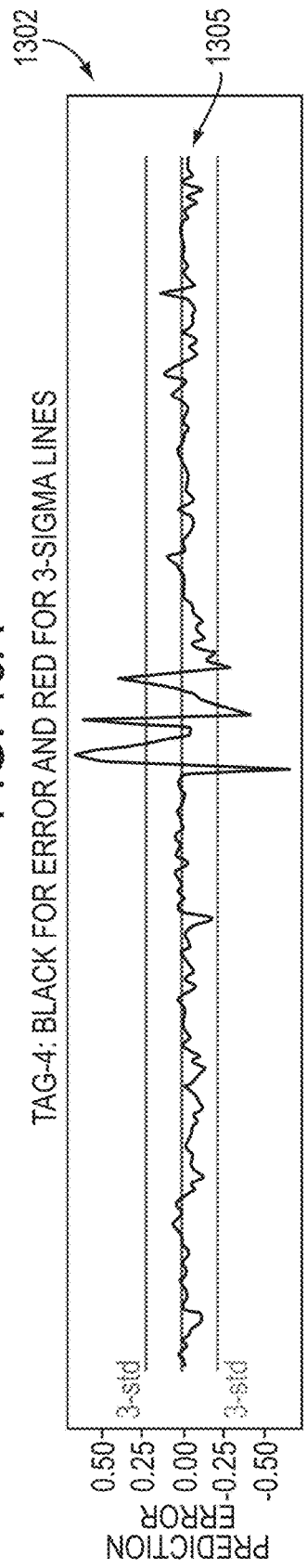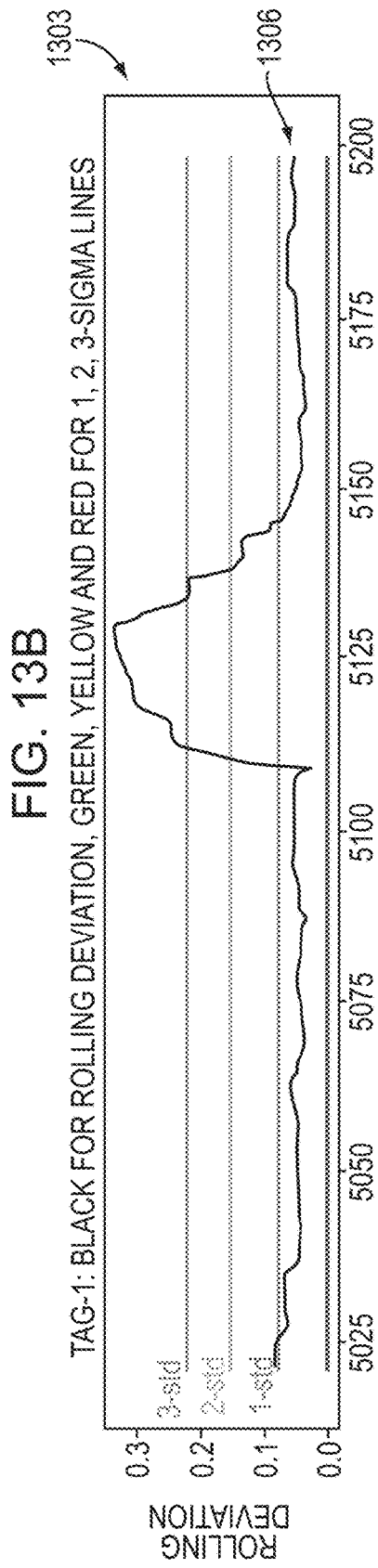
FIG. 13A
FIG. 13B
FIG. 13C

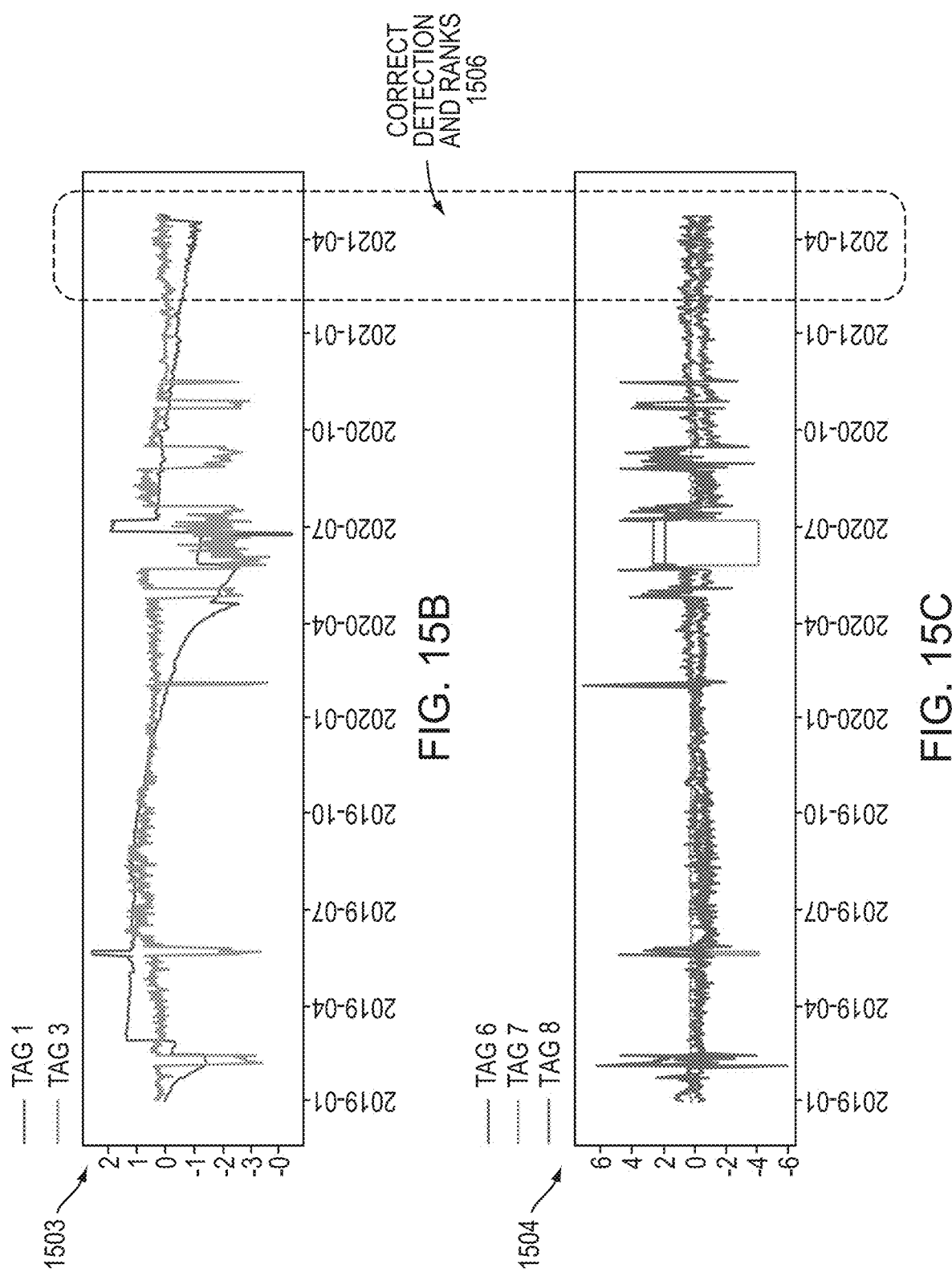

ANOMALY EVENT DETECTOR

BACKGROUND

Typically, in factories and plants, e.g., industrial manufacturing and processing facilities, operation and maintenance are important tasks. Such facility operation and maintenance have benefited from advances in process control and optimization technology, however, further improvements are needed.

SUMMARY

Many process control and optimization methods utilize complex data driven algorithms, such as machine learning, to predict, create, prevent, and/or optimize the behaviors of components of plants. A plant's components or equipment may have multiple normal operating states and many anomalous operating states due to a variety of reasons. If a component or equipment enters and/or operates in an anomalous operating state, it can be detrimental to the plant's operational optimization, output, or even safety. Therefore, it is helpful for plant operators to be notified if any anomalous state is developing or occurring. The early detection and analysis of anomalous operating states provides time for a proper response. For example, early detection can allow either repair to the equipment before it is damaged or safely shutting down the equipment for maintenance. Such early detection, not only saves costs by increasing plant efficiency and decreasing plant repair (or unscheduled maintenance), but also maintains a safer working environment for field engineers.

Existing approaches for detecting anomalous states in a plant are limited in their ability to only analyze components and equipment with distinct static operating states. These existing methods and systems are unable to handle common cases such as i) the equipment operation having slow progressive changes, ii) the equipment's sensor data including long seasonal trend(s), iii) the equipment operation including high oscillations, and iv) the anomalous operating state being unknown, amongst other examples. A need exists for innovative methods and systems to address the aforementioned limitations of existing approaches for detection and prediction of anomalous states and to provide more stable and consistent outputs on the performance probability trends and sensor ranks of anomalous states.

An embodiment is directed to a computer-implemented method for identifying an anomalous state of a component (e.g., piece of equipment, conduit, feed stream, other stream, and the like) in a real-world environment. Such a method receives data from at least one sensor of a component in a real-world environment. In turn, a machine learning model is executed to calculate, using the received data from the at least one sensor of the component in the real-world environment, a predicted behavior of the component. The method continues by computing a divergence based on a difference between an actual observed (measured)behavior of the component and the model predicted behavior of the component of the same time period. Such an embodiment then determines, using a statistic learning method, and indicates, whether the component in the real-world environment is in an anomalous state based upon (i) a scale of the divergence and (ii) a variation of the divergence.

The method may further comprise accessing historic operating data of the component in the real-world environment and training the machine learning model using the accessed historic operating data to calculate the predicted behavior of the component based on the data from the at least one sensor of the component in the real-world environment. The accessed historic operating data may include at least one of: data of the component in the real-world environment operating in a normal state and data of the component in the real-world environment operating in an anomalous state.

The method may also include preprocessing the received data based upon at least one of oscillations, seasonal trends, correlations, and historical anomalous states of the component in the real-world environment.

The machine learning model can be a long short-term memory (LSTM) recurrent neural network. Other neural networks are suitable. The statistic learning method can be a gaussian mixture model. Other statistic learning models are suitable.

The method can further perform the steps of determining and indicating a contribution score for the at least one sensor of the component in the real-world environment, where said contribution score measures a contribution to the divergence. The method can also determine and indicate a confidence in the determination if the component in the real-world environment is in the anomalous state based upon i) the scale of divergence and ii) the variation of the divergence.

The predicted behavior of the component can be a predicted value of a manipulated variable, such as a key performance indicator (KPI) of the component, of a proportional-integral-derivative (PID) controller of the component and the actual behavior of the component can be an actual (sensor measured) value of the manipulated variable of the proportional-integral-derivative controller of the component.

Another embodiment is directed to a computer-based system for identifying an anomalous state of a component in a real-world environment. The system includes a processor and a memory with computer code instructions stored thereon. The processor and the memory are configured to cause the system to implement any embodiment or combination of embodiments described herein. In one such embodiment, the system is configured to receive data from at least one sensor of a component in a real-world environment and execute a machine learning model to calculate, using the received data from the at least one sensor of the component in the real-world environment, a predicted behavior of the component. Further, the system computes a divergence based on a difference between an actual behavior of the component and the predicted behavior of the component, and determines, using a statistic learning method, and indicates whether the component in the real-world environment is in an anomalous state based upon (i) a scale of the divergence and (ii) a variation of the divergence.

In some embodiments, the processor and the memory, with the computer code instructions, are further configured to cause the system to access historic operating data of the component in the real-world environment and train the machine learning model using the accessed historic operating data to calculate the predicted behavior of the component based on the data from the at least one sensor of the component in the real-world environment.

In another embodiment, the processor and the memory, with the computer code instructions, are further configured to cause the system to interface, via a network, with one or more computing devices to perform the training. Additionally, in embodiments, the accessed historic operating data can include at least one of: data of the component in the real-world environment operating in a normal state and data of the component in the real-world environment operating in an anomalous state.

The processor and the memory, with the computer code instructions, can be further configured to cause the system to encrypt the machine learning model with a public key and decrypt the machine learning model with a private key.

The processor and the memory, with the computer code instructions, may be further configured to cause the system to preprocess the received data based upon at least one of oscillations, seasonal trends, correlations, and historical anomalous states of the component in the real-world environment.

For some embodiments of the system, the predicted behavior of the component can be a predicted value of a manipulated variable, such as a KPI of the component, of a proportional-integral-derivative (PID) controller of the component and the actual behavior of the component can be an actual value of the manipulated variable calculated by the proportional-integral-derivative controller of the component.

Yet another embodiment is directed to a computer program product for identifying an anomalous state of a component in a real-world environment. The computer program product comprises one or more non-transitory computer-readable storage devices and program instructions stored on at least one of the one or more storage devices. The program instructions, when loaded and executed by a processor, cause an apparatus associated with the processor to implement any embodiment or combination of embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 13A is a graph comparing actual values and predicted values of a monitored variable that includes a period of abnormal state operation, where the predicted values were determined using an embodiment of the invention.

FIG. 13B is a graph of the difference between the actual values and predicted values of a monitored variable as displayed in FIG. 13A.

FIG. 13C is a graph of the rolling deviation between the actual values and predicted values of a monitored variable as displayed in FIG. 13A.

FIGS. 15A through 15D are graphical illustrations of user interface screen views in pertinent part displaying various output of an embodiment. FIG. 15A displays a graph of multiple monitored variables and their contribution to a detected anomaly in the embodiment.

FIGS. 15B and 15C display graphs of sensor data for the monitored variables shown in the graph of FIG. 15A.

FIG. 15D displays a table of calculated values of the contribution of the multiple monitored variables to the detected anomaly of FIG. 15A. The table is output by embodiments.

DETAILED DESCRIPTION

Figure 1:
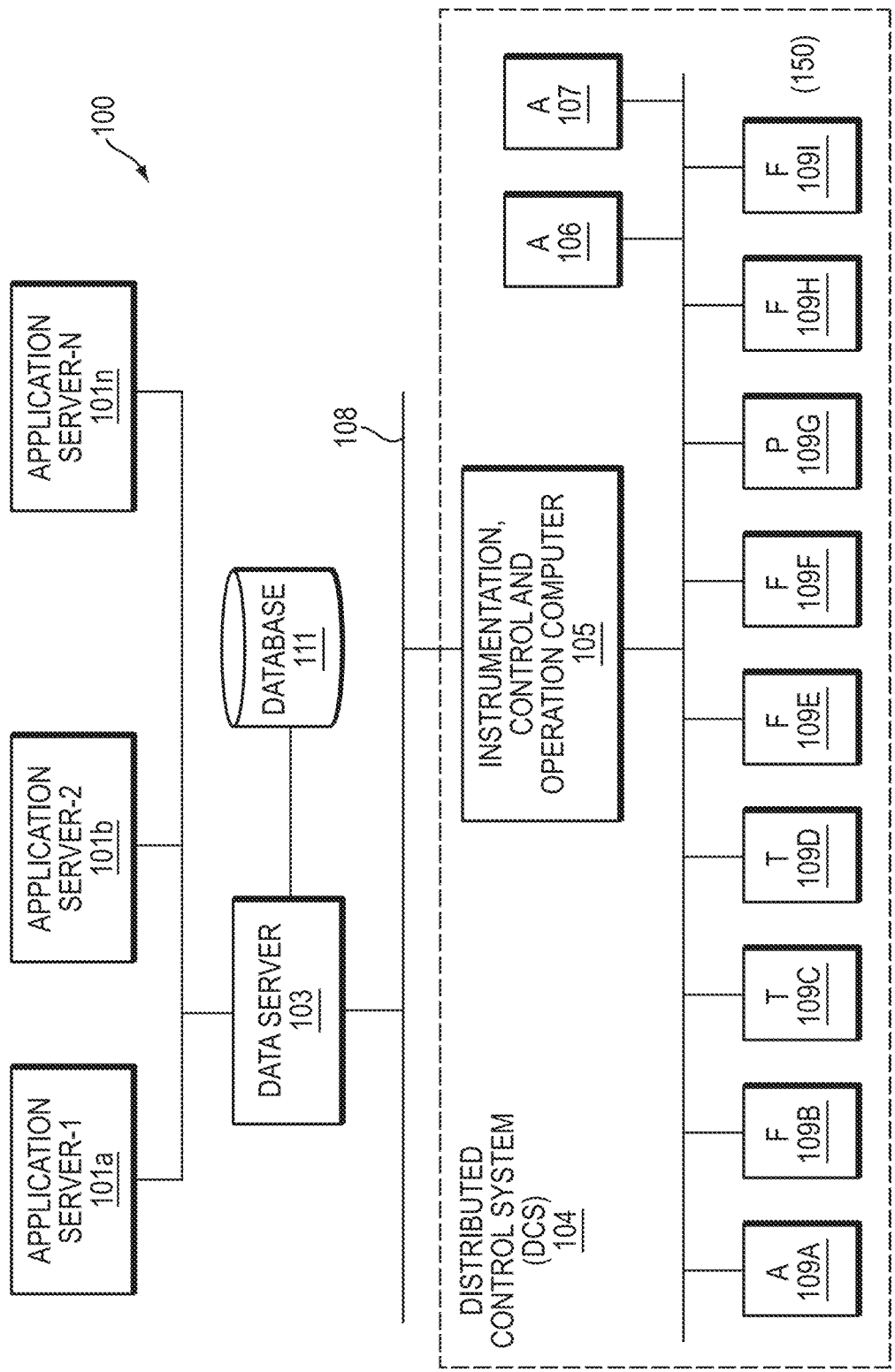
FIG. 1 is a block diagram illustrating an example network environment for identifying an anomalous state of a component of the example embodiments described herein.

A description of example embodiments follows.

Each piece of equipment/component of a processing plant, i.e., industrial facility, may behave under a unique statistical distribution based on certain of its physical properties. This behavior is monitored by sensors, and other tools used to measure the properties of the equipment/components. For example, a sensor may take measurements of a component's temperature over time and output a time series showing the measured temperature value over time. Plant operators and plant management systems can view and analyze the sensor outputs to monitor, predict, optimize, and control the plant's operation. Each equipment can have many sensors, each measuring different properties and providing separate outputs. This sensor data collectively reflects the behavior of a piece of equipment/component.

When equipment is operating as intended or expected, in other words, in a normal operating state, the equipment's physical properties, and therefore the sensor data measuring those physical properties, will likely stay in certain expected ranges. These expected ranges can either be derived from known first principles, past data, or a combination of both known first principles and past data. Equipment may have multiple normal operating states if the equipment is intended to operate in multiple modes. Each normal operating state will have its own respective expected ranges for the physical property measurements recorded in the sensor data.

When equipment deviates from its intended or expected operation, it is in an anomalous operating state. For example, if a furnace's temperature decreases below a desired threshold or a pipe starts to leak reducing flow rate. If a piece of equipment is in an anomalous operating state, its physical properties can change and this change can be measured by sensors and recorded in the outputted sensor data. In most cases, the physical properties of an equipment in an anomalous operating state are different from when the equipment is in a normal operating state. However, such differences may be minor, difficult to detect, and/or unexpected.

It is a goal of plant operating systems and personnel to use sensor data to detect or even predict when equipment enters or will enter an anomalous operating state. Since an anomalous operating state often is correlated with a change in the values of the physical properties, measured by sensors, from the expected values during normal operating states, changes, trends, and/or abnormal values in the sensor data may reflect a state change of the equipment. However, detecting these anomalous states is difficult due to the complexity of the monitored equipment and plants, the number of variables that can be involved, and uncertainty in the detection and analysis. Often, complex machine learning methods and algorithms are used to analyze the sensor data and identify potential periods when equipment is operating in an anomalous operating state.

New computer-implemented methods and systems are presented herein for identifying an anomalous state of a component (e.g., equipment unit, conduit, feed stream, other stream, etc.) in a real-world environment. Embodiments of these novel methods and systems utilize the data collected by sensors and/or data derived from the data collected by the sensors, as inputs for multiple machine learning techniques that are able, in concert, to determine and indicate if a component in a real-world environment is in an anomalous state, entering an anomalous state, and/or likely to enter an anomalous state.

Example Network Environment for Plant Processes

FIG. 1 illustrates a block diagram depicting an example network environment 100 for identifying an anomalous state of a component in a real-world environment according to an embodiment of the invention. System environment 100 includes computers 101*a-n* that are configured to perform anomaly detection and/or prediction and determine and indicate if a component in the subject plant (manufacturing/processing facility in question) 150 is in an anomalous state. In some embodiments, each one of the system 100 computers 101*a-n* may perform anomaly detection alone, or the computers 101*a-n* may operate together as distributed processors contributing to perform anomaly detection. Additionally, the computers 101*a-n* may be configured, alone or in combination, to receive inputs from and transmit outputs to a user.

The system 100 computers 101*a-n* may communicate with the data server 103 to access collected data of measurable process variables from a historian database 111. The collected data may be sensor data in the form of multivariate timeseries. Further, it is noted, that in the system 100, the computing devices 101*a-n* may be configured, alone or in combination, to receive data and user input from any point(s) communicatively coupled, or capable of being communicatively coupled to the computing devices 101*a-n*.

The accessed collected data in historian database 111 includes data collected during operating states of monitored equipment or components of the subject plant 150. The data may be collected during normal operating states, anomalous operating states, and transitions between states of one or more equipment or components of subject plant 150. The data server 103 may be further communicatively coupled to a distributed control system (DCS) 104, or any other plant control system, which may be configured with sensors 109A-109I that collect data for measurable process variables. Data may be collected by the sensors 109A-I at a regular sampling period (e.g., one sample per minute). The measurable process variables correspond to the physical properties of at least one monitored piece of equipment or component of the subject plant 150. The data collected by sensors 109A-109I may be stored in database 111 and be accessed by computing devices 101*a-n*. In the system 100, the sensors 106,107 are online analyzers (e.g., gas chromatographs) that collect data at a longer sampling period. The data collected varies according to the type of process monitored by sensors 109A-109I, 106, and 107. Embodiments of the system 100 may be configured to collect and store any desired type of data. Further, the system may be configured to use any sensors known in the art and said sensors may be configured to collect data using any desired scheme.

The sensors 109A-109I, 106, and 107 may communicate the collected data to an instrumentation computer 105, also configured in the DCS 104, and the instrumentation computer 105 may in turn communicate the collected data to the data server 103 over communications network 108. The data server 103 may then archive the collected data in the historian database 111 for anomalous state detection and other plant control purposes.

According to an embodiment, the data collected and stored in the historian database 111 includes a multivariate timeseries for each sensor 109A-109I comprising the output of each sensor at a regular sampling period. Sensor output may include measurements for various measurable process variables corresponding to the physical properties of one or more equipment units or components of subject plant 150. These measurements may include, for example, a feed stream flow rate as measured by a flow meter 109B, a feed stream temperature as measured by a temperature sensor 109C, component feed concentrations as determined by an analyzer 109A, and reflux stream temperature in a pipe as measured by a temperature sensor 109D. Sensor output may also include measurements for process output stream variables, such as, for example, the concentration of produced materials, as measured by analyzers 106 and 107. Sensor output may further include measurements for manipulated input variables, such as, for example, reflux flow rate as set by valve 109F and determined by flow meter 109H, a re-boiler steam flow rate as set by valve 109E and measured by flow meter 109I, and pressure in a column as controlled by a valve 109G. The collected sensor 109A-I, 106, and 107 data reflects the operation conditions of the representative/subject plant 150 during a particular sampling period.

If the equipment/components monitored by sensors 109A-109I, 106, and 107 were operating in an anomalous state during the particular sampling period, the collected sensor data may be used by embodiments to determine when the monitored equipment/components are in an anomalous state. In some embodiments, the collected sensor data may also be used to determine the possibility that the equipment/components monitored by sensors 109A-109, 106, and 107 are in an anomalous state and the contribution of each sensor 109A-109I, 106, and 107. The system computers 101a-n utilize the historical data collected from sensors 109A-109I, 106, and 107, to create a predictive model that can generate a predicted output for at least one of the sensors 109A-109I, 106, and 107. The system computers 101a-n may further compare current or historical outputs of the sensors 109A-109I, 106, and 107 to the predicted sensor output(s) to determine if monitored equipment/components are in an anomalous operating state, were in an anomalous operating state, or are entering an anomalous operating state. Such functionality may include the computers 101a-n performing the methods 400, 500, described hereinbelow in relation to FIGS. 4 and 5. The system computers 101a-n may output to a user an indication that the monitored equipment/components are or were in an anomalous operating state or are likely to enter an anomalous operating state. This indication will permit a plant operator and/or plant control system 104 to determine if action needs to be taken to correct, prevent, or fix the identified anomalous operating state. The database 111 may also be used to store sensor outputs collected during an identified anomalous operating state to facilitate system computers 101a-n and/or plant control system 104 identifying future anomalous operating states using the outputs of sensors 109A-109I, 106, and 107 and/or be used as validation data points or metrics during the training and execution of the models utilized in methods 400, 500 and described herein.

The system 100 computers 101 and 102 may execute the methods 400, 500, described hereinbelow in relation to FIGS. 4 and 5, for online deployment purposes. The outputs and results of methods 400, 500 may be provided to the instrumentation computer 105 over the network 108 for an operator to view, or may be provided to automatically program any other component of the DCS 104, or any other plant control system or processing system coupled to the DCS system 104. Alternatively, the instrumentation computer 105 can store the historical data 111 and/or data collected by sensors 109A-109I, 106, and 107 through the data server 103 in the historian database 111 and system computers 101a-n may execute methods 400, 500 offline.

The example architecture 100 of the computer system supports the process operation of a representative/subject plant 150. In such an embodiment, the representative plant 150 may be any plant known in the art, such as a refinery or a chemical processing plant, having any number of measurable process variables, such as, for example, temperature, pressure, and flow rate variables. It should be understood that in other embodiments a wide variety of other types of technological processes or equipment in the useful arts may be used.

In subject pant 150, each equipment unit operating state may behave under a unique statistical distribution and follow certain physical principles. Embodiments of the invention may utilize two types of machine learning algorithms to effectively detect anomalous states and identify the multiple operating states in order for users to differentiate the optimal operating state and an unknown anomalous state. A representative of a first type of machine learning algorithm that may be used by embodiments is a Gaussian mixture model (GMM). The GMM can be used to identify distinct operating states. A representative of a second type of machine learning algorithm that can be utilized by embodiments is long short-term memory (LSTM). LSTM can be used to learn the dynamics of sensor behavior and the monitored properties. These two types of algorithms, GMM and LSTM, provide a general framework to analyze the equipment operation and performance for multiple different industries such as refinery, oil, pharmaceutical, and mining, amongst others.

Figure 2A:
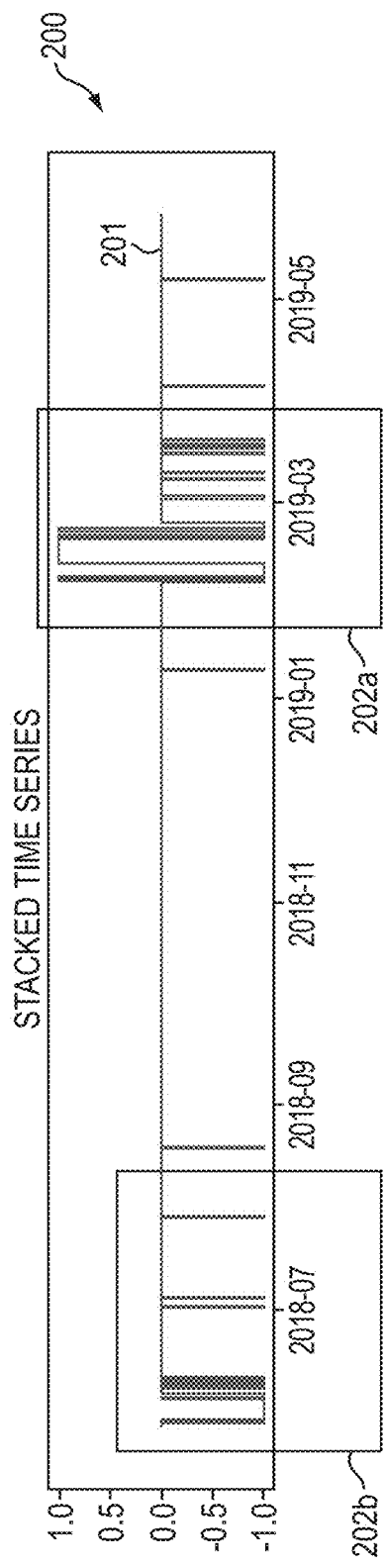
FIG. 2A is a graph of sensor data, displayed as a stacked time series, for a component with distinct normal operating states.

FIG. 2A is a graph 200 of sensor data 201, displayed as a stacked time series, for a component, e.g., piece of equipment, of subject plant 150, with distinct normal operating states. Some equipment, such as a compressor, have clearly normal distinct states during the operation and each state represents a certain operation mode. Therefore, the data collected by sensors for such equipment will be clustered, with different clusters representing the different operating states. Graph 200 displays sensor data 201 as time series, with the values of monitored parameters comprising the y axis and the time those values were taken comprising the x axis. The clusters of data, 202a and 202b, correspond to distinct operating states.

Figure 2B:
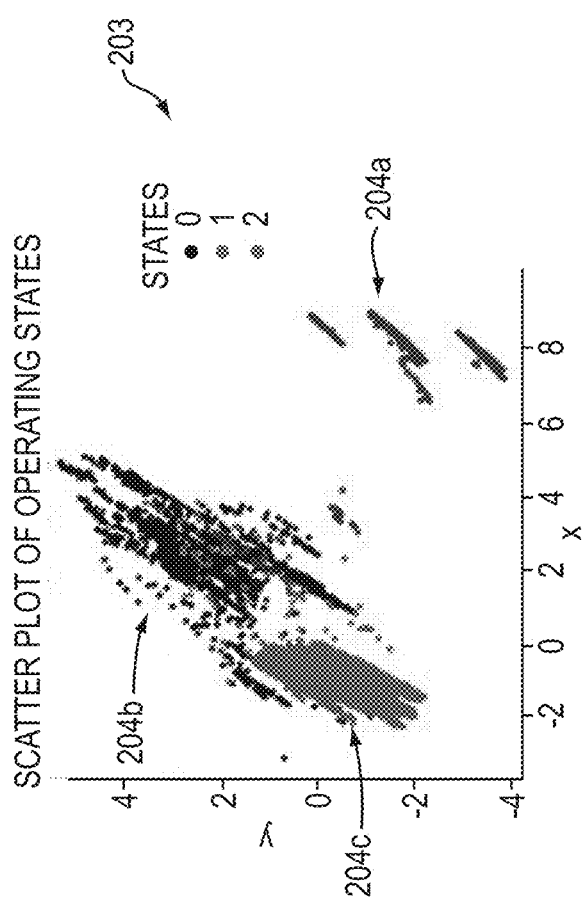
FIG. 2B is a graph of sensor data, displayed as a scatter plot, for a component with distinct normal operating states.

FIG. 2B is a graph 203 of sensor data 204a, 204b, 204c (generally 204), displayed as a scatter plot, for a component with distinct normal operating states. Graph 203 shows the values of a first monitored parameter and a second monitored parameter comprising the y and x axis. Graph 203 displays sensor data in three clusters, 204a, 204b, and 204c. Each cluster 204a-c corresponds to a different operating state. In graph 203, principle component analysis (PCA) is used to determine the most relevant monitored parameters (the principle components) that capture the differences between operating states. Embodiments of the invention may use PCA either independently or in connection with the disclosed machine learning algorithms herein to perform variable reduction on the sensor data and/or identify the most relevant monitored parameters. For data 201, 204, that has multiple distinct clusters that correspond to normal operating states, GMM is capable of performing anomaly detection. In such situations, GMM is applied to both identify the distinct operating states and their associated data clusters and provide a likelihood function to measure how far new data is away from the known clusters. The new data, may be real time sensor data that is indicative of the current operating conditions of the plant 150 and its monitored equipment. The further away new data is from a cluster that corresponds to normal operating states, the higher the likelihood that the new data was collected during a state of anomalous operation.

In contrast, other types of monitored equipment or components, may only show slow progressive changes over time. In such situations, the collected sensor data does not have clearly distinct clusters. In contrast, the data displays slow changes that follow the nature of relevant first principles.

Figure 3:
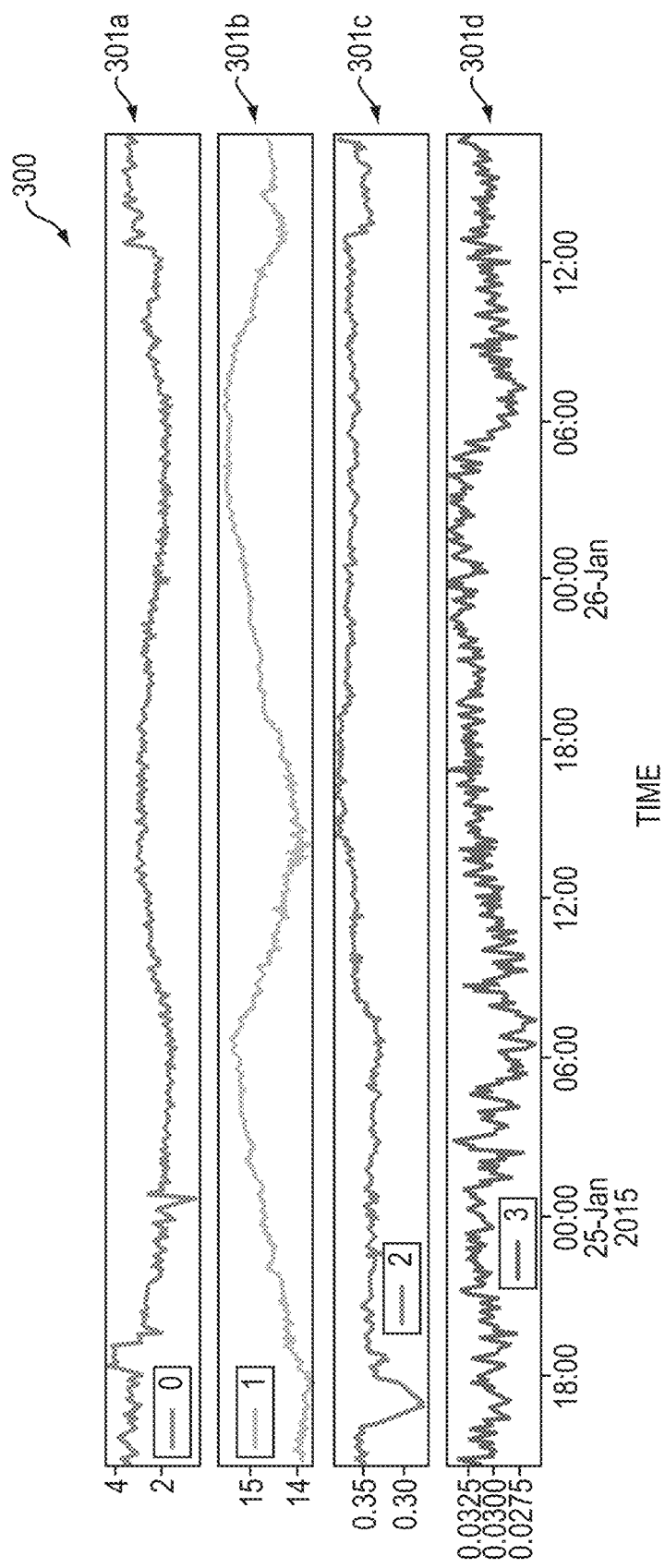
FIG. 3 is a graph of sensor data displayed as a set of time series, for a component without distinct normal operating states.

FIG. 3 is a graph of sensor data 301 displayed as a set of time series, for a component without distinct normal operating states. Graph 300 displays, in parallel, sensor data 301a, 301b, 301c, 301d from four sensors as time series, with the values of monitored parameters comprising the y axis and the time those values were taken comprising the x axis. As shown in FIG. 3, and in comparison, to FIGS. 2A and 2B, there are no clearly defined clusters in the displayed sensor data 301a, 301b, 301c, 301d. Therefore, there is no way to measure the distance between data being collected and known clusters of non-anomalous operation data so as to detect anomalies.

To monitor, detect, and/or predict the anomalous behavior of equipment without sensor readings showing distinct normal operating states, a method requires more than just the application of a single algorithm, such as GMM. First, the collected data must be analyzed to determine what the normal behavior of the monitored equipment is. In some embodiments, this is done by training a predictive model, using deep learning, that outputs predicted sensor data. In some embodiments, the predictive model is trained with a machine learning algorithm such as a LSTM recurrent neural network and collected sensor data. This predicted sensor data generated by the trained predictive model is functionally similar to the known clusters for equipment with distinct normal operating states. For instance, the aforementioned clusters and output of the predictive model indicate non-anomalous operation. To continue, the predicated sensor data is compared to the actual sensor data and the distribution of error between the predicted sensor data and actual sensor data is analyzed to determine if the actual sensor data was collected during an anomalous operating state. In some embodiments, this analysis is performed using machine learning algorithms such as the GMM.

Figure 4:
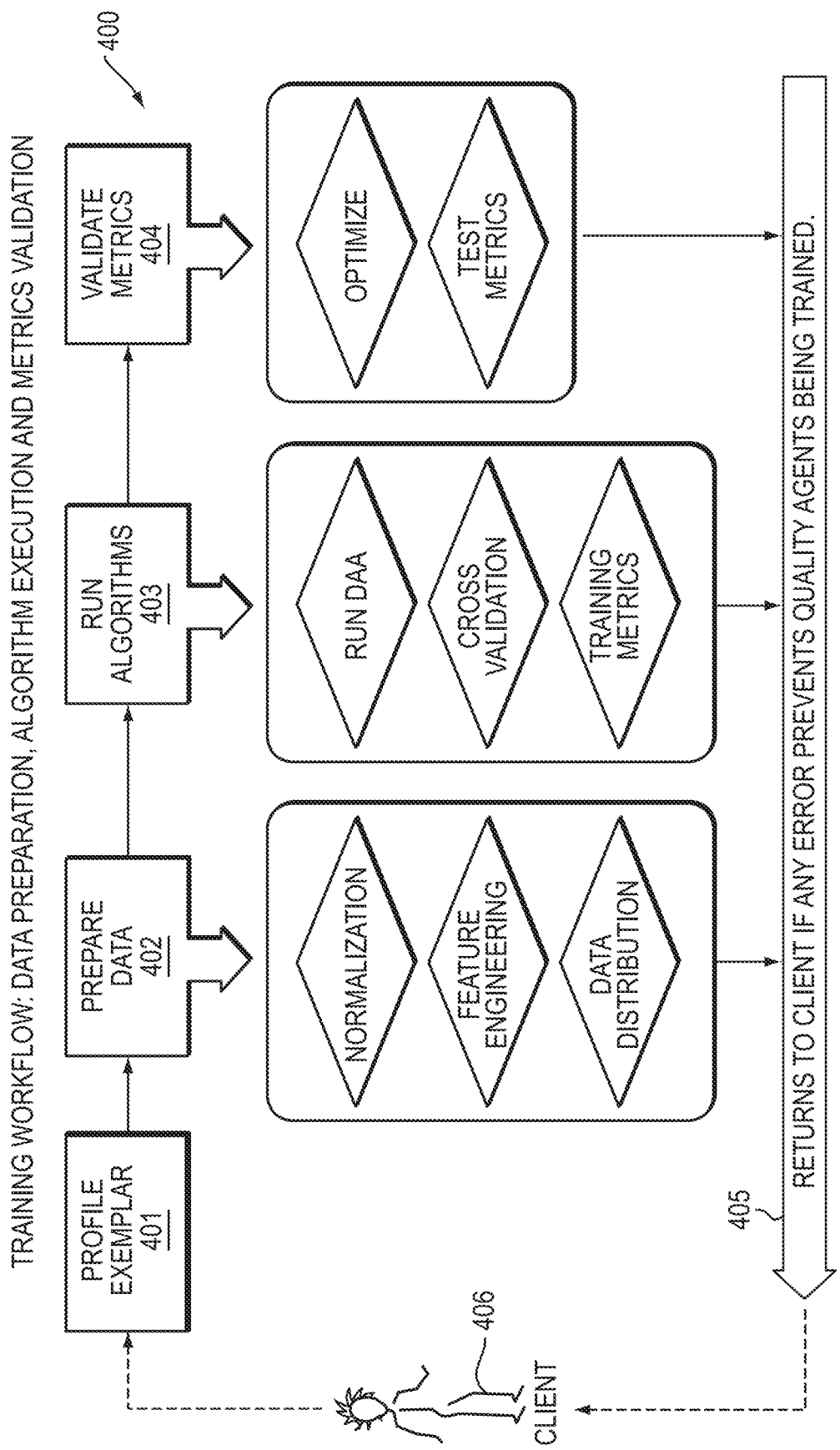
FIG. 4 is an illustration of a workflow of data preparation, algorithm execution, and metric validation according to an embodiment of the invention.

FIG. 4 is an illustration of the workflow 400 of data preparation, algorithm execution, and metric validation according to an embodiment of the invention. Workflow 400 may be initiated by a user 406, for example a plant engineer. Alternatively, user 406 may be a process control system that automatically initiates workflow 400 independent of human input. In some embodiments, a profile exemplar 401 for monitored equipment is provided. The profile exemplar 401 may include an identification of the variables/parameters included in the sensor data and provide guidance for how the raw sensor data is to be received, handled, and stored. Next, the sensor data is prepared 402. Data preparation 402 can be applied to the collected sensor data used to train a predictive model and/or the sensor data that will be compared with the output of that predicted model. During data preparation, sensor data may be preprocessed to better handle the oscillations and long seasonal trends of equipment that undergoes slow progressive changes. Preprocessing may also be used to analyze the distribution of the sensor data to determine if further action is needed before training models. The purpose of data preparation 402 is to identify and select useful data from the raw sensor data and, in some embodiments, extract the specific variables and/or sensor outputs that will be utilized in the machine learning algorithms of later steps. During the prepare data 402 step, methods such as normalization and feature engineering may be utilized to accomplish these goals. Normalization may be used to adjust all measurements of monitored variables to a single common scale. Feature engineering may be used to create new variables, composed of the monitored variables to either reduce data complexity or improve algorithm performance and training After the data is prepared in step 402, the algorithms are run 403. An example embodiment uses two different algorithms. The first algorithm is LSTM, which is used to train a predictive model based on past sensor data. This predictive model is configured to predict sensor data, or information derivable from sensor data, for a given facility 150. The second algorithm, GMM, compares the output of the predictive model with new data, or information derived from new data, to determine if the new data was gathered during a period of anomalous operation. As part of the run algorithm step 403, cross validation, training metrics, and other techniques may be utilized to improve the performance of the algorithms. Specifically, in step 403, a first algorithm uses the prepared data of step 402 and profile exemplar to learn and create a model for normal behavior, including seasonal and/or longer-term trends, of the monitored equipment. This algorithm may be a LSTM that utilizes a neural network as detailed later. The first algorithm may produce a deep anomaly analyzer or DAA agent that predicts the behavior of the monitored equipment using prepared data based on inputted sensor variables in prepared data 402. After the DAA agent is created, it can predict the normal or expected behavior of the monitored equipment, and a second algorithm can be used to compare the actual behavior of monitored equipment to the predicted normal behavior. The greater the deviation, between parameter or variable values (possibly derived) of the actual monitored behavior and the parameter/variable values of the model predicted normal behavior, the increased likelihood that the monitored equipment is in a period of anomalous operation. Known training data, or training metrics can be used to verify that the output of each algorithm is producing results consistent with expected outputs, e.g. identifying a known anomaly. Similarly, cross validation can be used to train and run the algorithms 403 on different subsets of prepared data 402 to create and test different iterations of the algorithms 403 for comparison and accuracy improvement.

Finally, after the algorithms are run (step 403), validation metrics are used at step 404 to confirm and improve the accuracy of the determination if the new data was gathered during a period of anomalous operation. For example, in some embodiments, known historical anomalies and/or normal operational data may be utilized to optimize and improve algorithm accuracy. Additionally, certain outlier data points may be identified as test metrics and flagged for further monitoring. If, during any of the steps 402, 403, or 404, an error occurs, it may be reported 405 to the user 406.

Figure 5:
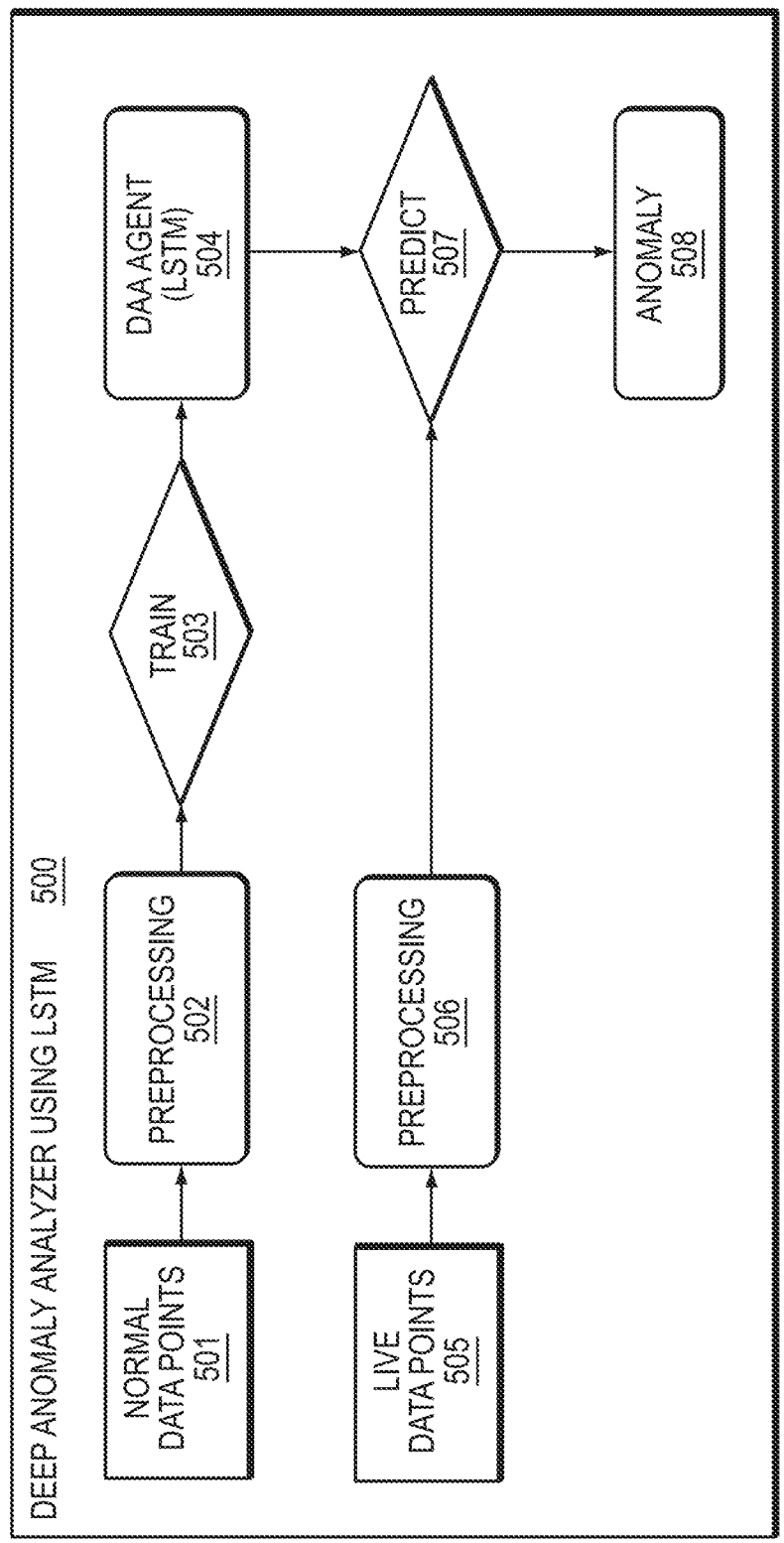
FIG. 5 is a flow chart of a method of detecting an anomaly according to an embodiment of the invention.

FIG. 5 is a flow chart of a method 500 of detecting an anomaly in plant operations (functioning and run time behavior) according to an embodiment of the invention. Method 500 can be utilized as part of workflow 400 and utilizes two machine learning algorithms to determine if live data points 505 were collected during an anomalous operating state. Historical normal operating state data points 501, collected by sensors during normal operations are preprocessed 502 and used to train 503 a predictive model (deep anomaly analyzer or DAA agent) 504. In other words, in step 501, historic data collected by sensors of at least one component in a real-world environment (e.g., plant 150) is accessed. Preprocessing 502 can utilize the methods disclosed during step 402 of workflow 400. In some embodiments, a LSTM neural network is used to train 503 the predictive model using the preprocessed 502 normal data points 501. Once trained, the predictive model 504 outputs predicted data points of a normal operating state. In some embodiments, in step 503, a machine learning model is trained to calculate a predicted behavior based on the data from the at least one sensor of the component in the real-world environment by processing the accessed historic data. Since predictive model 504 is trained 503 using normal data points 501, its outputted predicted data points or indications of behavior correspond to the functioning (operational) behavior of the monitored equipment if it was in normal operating state.

In step 505 data, such as live data points, are received from at least one sensor of a component in a real-world environment (plant 150). Separately, live data points 505 are preprocessed 506. Preprocessing 506 can also utilize the methods disclosed during step 402 of workflow 400. In step 507, the preprocessed live data points 505 are provided as input to the trained predictive model 504 to predict 507 variable values. The trained machine learning model is executed to use the received data from steps 505, 506 to calculate a predicted future time (t) behavior 507 along the normal operating state trajectory (as trained to in step 503 described above). The predicted behavior variable values may be part of live data points 505 or variables excluded from live data points 505. Then, the predictions (output) 507 of the predictive model 504 for time t are compared to the actual (measured at time t) variable values or actual behavior using a statistic learning method in step 508. During this comparison, a divergence may be computed. The divergence is based on the difference between an actual behavior (plant sensor reading at time t) and the predicted behavior (model output 507 for time t). In some embodiments the statistic learning method may be a GMM algorithm. In step 508, the scale and variation of the divergence between the actual (plant at time t) variable values or behavior and the output 507 of the predictive model 504 using live data points 505 as input may be analyzed. Based on this comparison, in step 508, it can be determined if the variable values of live data points 505 were captured during an anomalous operating state. The greater the difference between the actual plant at time t variable values and the prediction 507 variable values of the predictive model, trained using normal operating state data points 501, the more likely the variable values/live data points of step 505 were captured during an anomalous operating state. Embodiments may use both the scale of the divergence and the variation of the divergence to determine and indicate whether the component in the real-world environment (plant 150) is operating in an anomalous state.

In other words, the output 507 of the predictive model is utilized in a similar matter to the clusters 202, 204 that are defined if the monitored equipment has distinct operating states. Both the output 507 of the predictive model and the clusters 202, 204 act as representative behavior of the monitored equipment under normal operation. The output 507 of the predictive model enables the method 500 to determine the "expected" values of the monitored data collected by sensors during normal operations. Existing (prior art and state of the art) methods, used clusters 202, 204 to determine the "expected" value but, unlike embodiments of the present invention, if the monitored equipment did not have distinct normal operating states and clusters 202, 204 did not form, they were unable to predict normal equipment behavior. The DAA agent 504, solves this deficiency by using normal data points 501 to train 503 a predictive model that can predict 507 what the variable values would be if the monitored equipment is operating normally.

Method 500 solves a gap in existing (prior art) anomaly detection methods that are unable to deal with equipment that does not have distinct operating states. Steps 501, 502, and 503 that result in predictive model 504 provide a novel way of generating expected behavior (normal operating state trajectory of variable values) that represents normal operation that can then be compared to live data points 505. Previous methods in the art are unable to determine this expected behavior for sensor data that does not have distinct operating states. By using the normal data points 501 to train a predictive model whose output represents the learned normal behavior of the monitored equipment, method 500 allows for anomaly detection in situations that existing (prior art) methods cannot provide namely, live data from equipment with non-distinct operating states, and live data with non-Gaussian distributions. Method 500, allows for the use of deep learning algorithms, such as LSTM, to learn the dynamics of equipment operation from live data points 501 and train 503 a predictive model 504 that accurately captures those learned dynamics, including slow seasonal or progressive changes that could be missed by prior art methods. Overall, method 500, and other embodiments of the invention disclosed herein provide more stable anomaly detection methods and solutions for industries such as mining, pulp and paper, and pharmaceutical and may be integrated into existing online detection systems.

Figure 10:
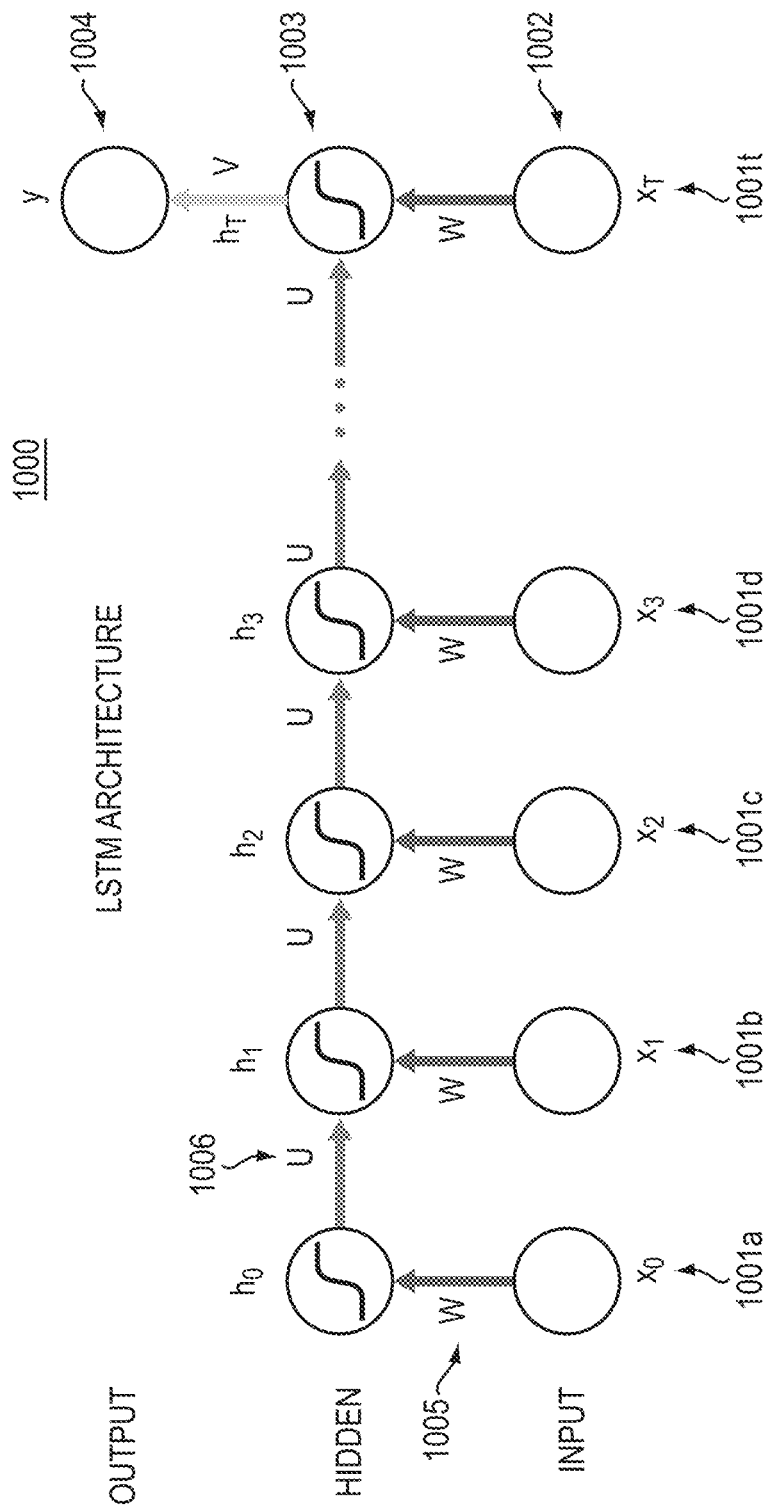
FIG. 10 is a schematic diagram of a long short-term memory (LSTM) neural network architecture utilized by an embodiment of the invention.

Embodiments of the invention utilize neural networks, e.g. the neural network 1000 shown in FIG. 10, another application of LSTM algorithms, or other machine learning methods to train a predictive model 504. The predictive model 504 is trained using sensor data 501 collected during normal operation. The predictive model 504 can then predict 507 variable values (dependent variable values) collected by sensors and contained in the sensor data using other variable values (independent variable values) collected by sensors and contained in the sensor data. Because the predictive model 504 was trained using sensor data 501 collected during normal operation, its predictions show the expected values of the dependent variables if the monitored components were in a normal operating state. When new data is received, the predictive model 504 can use some or all of it as an input to generate a predicted value for the dependent variables. However, actual values for the dependent variables can either be included in the new data or determined from the new data. The new data, in some embodiments, is or includes live data points 505, and the predictive model 504 generates predicated dependent variables values in real time. In some embodiments, the predictive model 504 models the behavior of a KPI of a component, which can be compared to the actual behavior of the component. The KPI can be an output of a proportional-integral-derivative (PID) controller which can be compared to the actual output of the PID controller. The more the prediction (output) 507 of the predictive model diverge from the actual values (in plant measured values or sensor readings) of the dependent variables, the greater the probability the monitored equipment or component is in an abnormal operating state.

Figure 6:
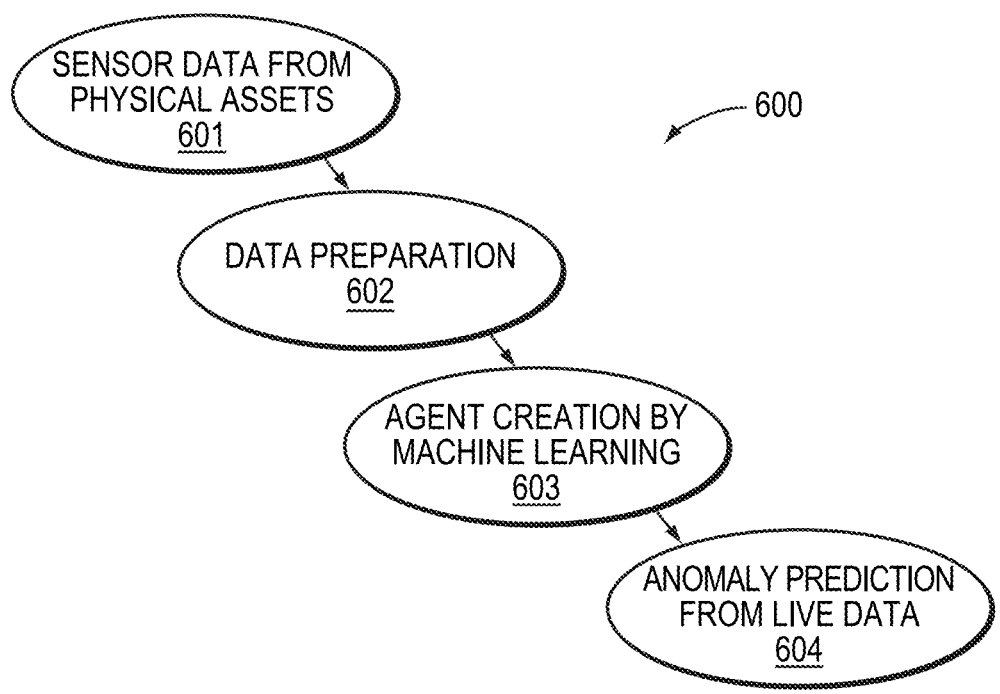
FIG. 6 is a workflow diagram of anomaly detection according to an embodiment of the invention.

FIG. 6 is a workflow diagram of anomaly detection according to an embodiment of the invention. Workflow 600, is able to predict, from live data, if a monitored physical asset is in an anomalous state. In the workflow 600, first, sensor data from physical assets 601, e.g., a monitored plant component or equipment, is received. Next, the received sensor data is prepared 602. The methods that can be used in step 602 are discussed in more detail below and can be selected based on the needs of the user and the properties of the plant 150 the method 600 is utilized in. The goal of data preparation 602 is to select useful data from the raw sensor acquisition and/or to extract feature to use for training machine learning algorithms. Next, a predictive model or agent is created 603, using the received data and/or extracted features with machine learning. Finally, the output of the predictive model or agent is compared to live data (sensor readings or otherwise measured data of the plant 150) at 604 and analyzed using an additional machine learning algorithm to determine whether the live data indicates the physical asset is in an anomalous state. Live data may also be subjected to the methods used in data preparation step 602 prior to analysis at step 605. The anomaly prediction based on the live data at step 604 results in a prediction with two primary aspects, the confidence of a detected anomaly, if any, and the root cause of the anomaly in terms of sensor contribution. In other words, root cause indicates which sensor and the parameter the sensor measured that most contributed to the determination that an anomaly exists. The parameter measured by the sensor may be, for non-limiting example, temperature, pressure, flow rate, etc. As a root cause of the anomaly, the measured value of the parameter (sensor measurement or reading) is outside of (e.g., above or below) the range of normal state operating values to an extent that has greater impact than other parameters as measured by corresponding (respective) sensors determining operating state of the physical asset (i.e., plant component/equipment unit).

Figure 7:
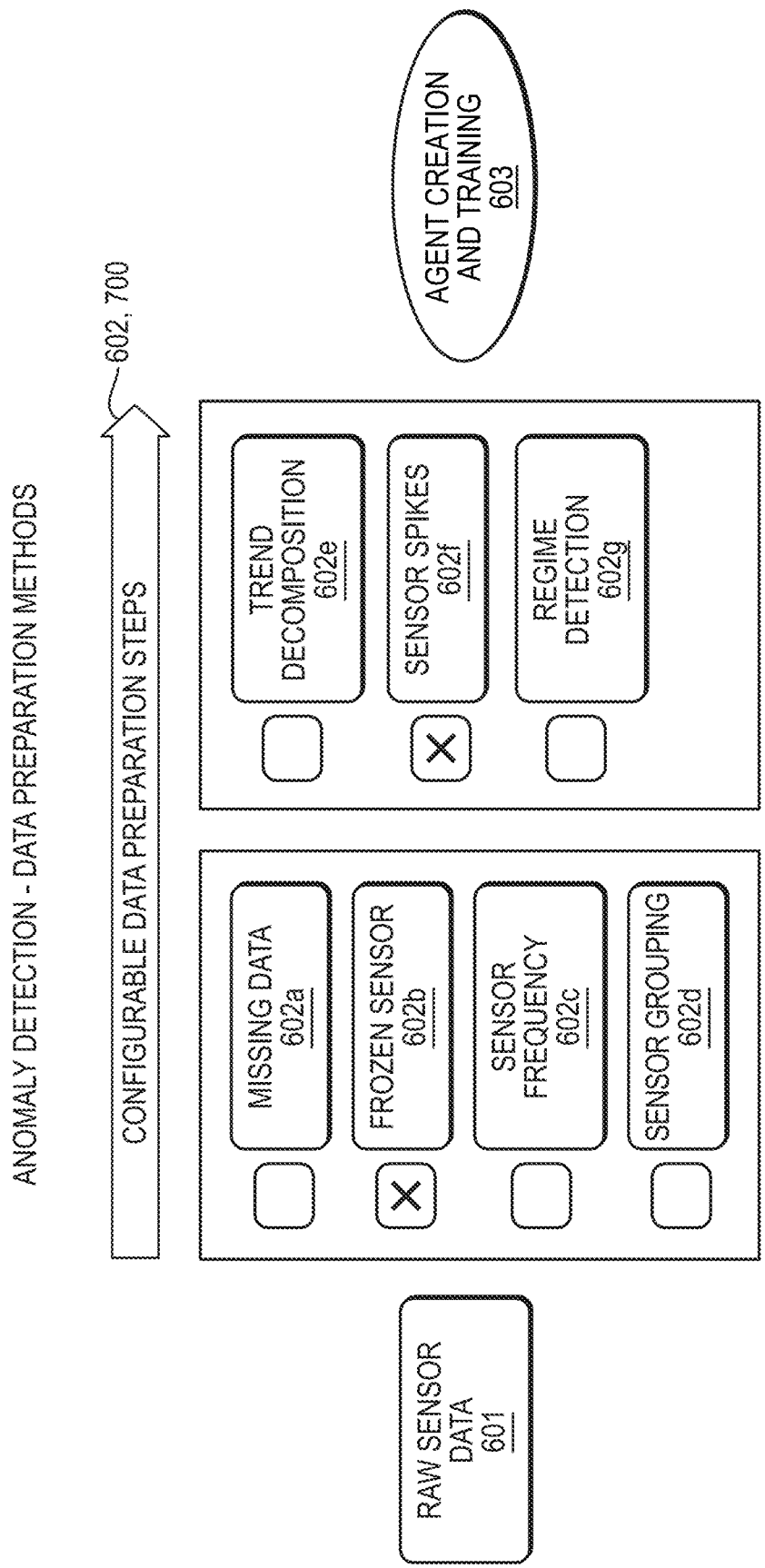
FIG. 7 is an illustration of possible methods that may be included in data preparing and preprocessing steps of embodiments of the invention.

FIG. 7 is an illustration of possible methods that may be included in the data preparing and preprocessing steps 602, 700 of embodiments of the invention. The raw sensor data 601, can be prepared with a range of methods before it is utilized to create and train the predictive model/agent 603 in method 600 of FIG. 6. The data preparation step 602, 700 may be configurable so that a user may select which data preparation/preprocessing methodologies are used. Non-limiting examples of available methods include detection of missing data 602a, frozen sensor identification 602b, sensor frequency analysis 602c, sensor grouping 602d, trend decomposition 602e, sensor spike detection and treatment 602f, and regime detection 602g. The possible preprocessing methods shown in FIG. 7., in any desired or user selected combination, can also be utilized by embodiments of the invention such as, but not limited to, during steps 502 and 506 of method 500 of FIG. 5.

To illustrate, at step 602a and 602b, missing or frozen values in the data acquired from the sensors can be identified and reported to plant engineers. In addition, missing or frozen values, can be excluded from the data that is used to train the predictive models in step 603 because such data does not accurately reflect the properties of the monitored equipment. To detect missing or frozen sensor data 602a and 602b, embodiments of the invention may identify periods of flat data across multiple sensors. Embodiments of the invention, at step 602a and 602b, may also convert the moving average of missing data with a sigmoid-like likelihood function to measure the severity of data reliability. If data reliability is reduced below a set threshold, the data may be excluded. Furthermore, embodiments of the invention may apply a gradient-based approach at step 602a and 602b to monitor the changes in sensor data to identify unexpected or unnatural changes that indicate the existence of missing or frozen sensor data.

During data preparation step 602, 700, embodiments of the invention may determine 602c the dynamic frequency pattern of the sensors based upon zero-crossing, the rate at which a signal changes from positive to zero to negative or from negative to zero to positive. Embodiments of the invention may also determine the noise level for the sensors based on their signal-to-noise ratio.

Figure 8:
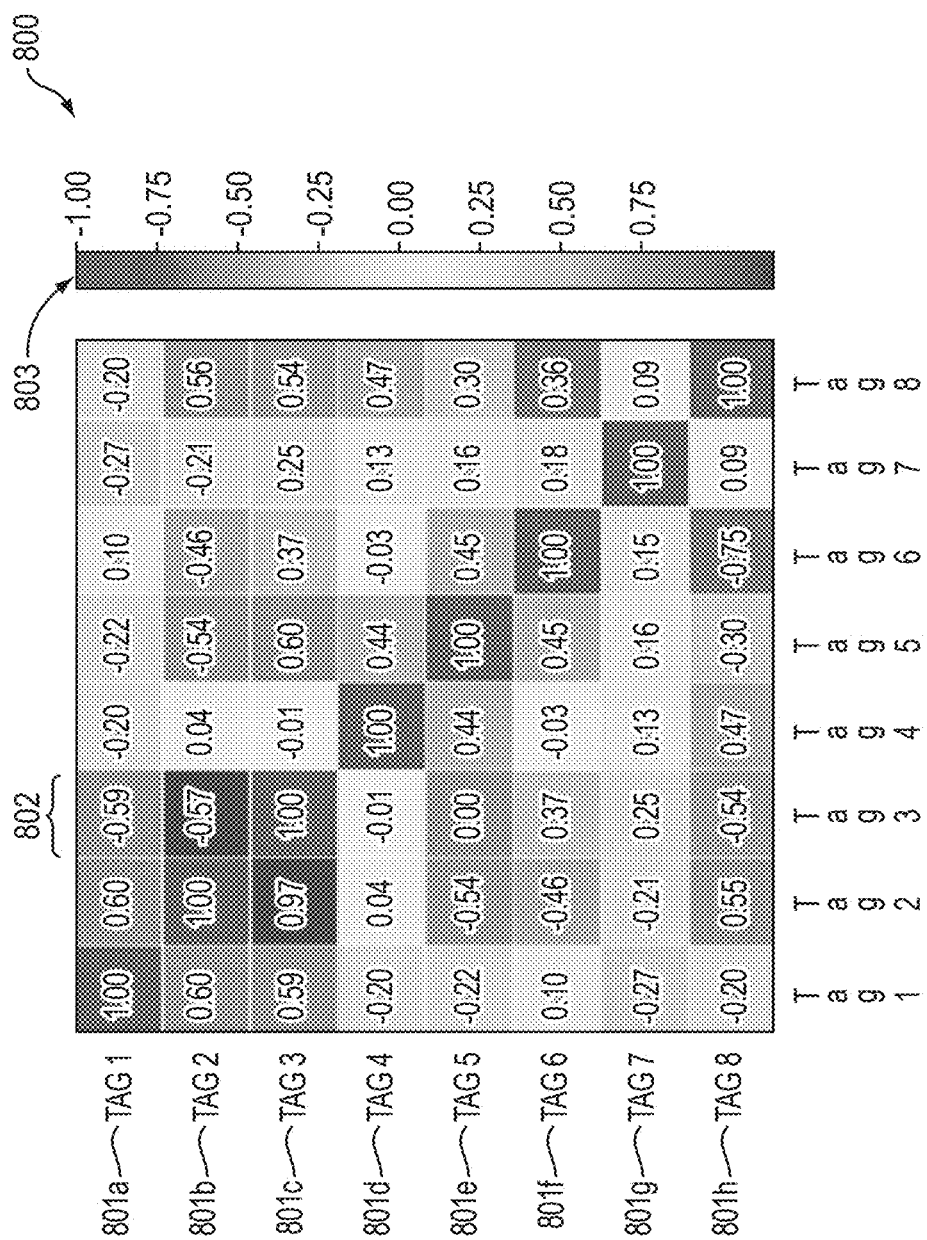
FIG. 8 is a comparison chart of data collected by a set of sensors that indicates correlation between the sensors.

FIG. 8 is a comparison chart 800 of the data collected by a set of sensors that indicates correlation between the sensors. As part of the data preparation step 602, 700, embodiments of the invention may combine data from sensors that have correlated outputs and select the best sensor from the combined group (sensor grouping 602d). For non-limiting example, if one sensor measures temperature and another sensor measures pressure, and increasing the temperature also increases the pressure, these sensors and their collected data may be grouped together. Then, if temperature data is known to be more accurate, only the temperature data may be utilized to train a predictive model at step 603. This allows for a reduction in the number of variables in the data that are used to train the predictive model in step 603. Chart 800 shows the correlation between 8 different variables, "tags", 801a-h (collectively 801) measured by sensors monitoring plant components. Variable correlation, positive and negative, values are shown in the cells 802 and color-coded based on key 803. If desired, highly correlated variables may be grouped together and a single variable chosen to represent all grouped variables.

During data preparation step 602, 700, embodiments of the invention may also perform trend analysis (trend decomposition 602e). Trend analysis may include Seasonal-Trend decomposition using Loess (STL). STL uses a set of locally fitted regression models. When these locally fitted regression models are applied to the sensor data, they split the data into multiple components, the trend, seasonal, and remainder components. When split into these components, the long-term patterns in the sensor data can be identified and corrected or excluded for if required. This allows for live data taken during a specific season or trend to be compared to the output of a predictive model trained with data taken during a different season or trend.

Figure 9A:
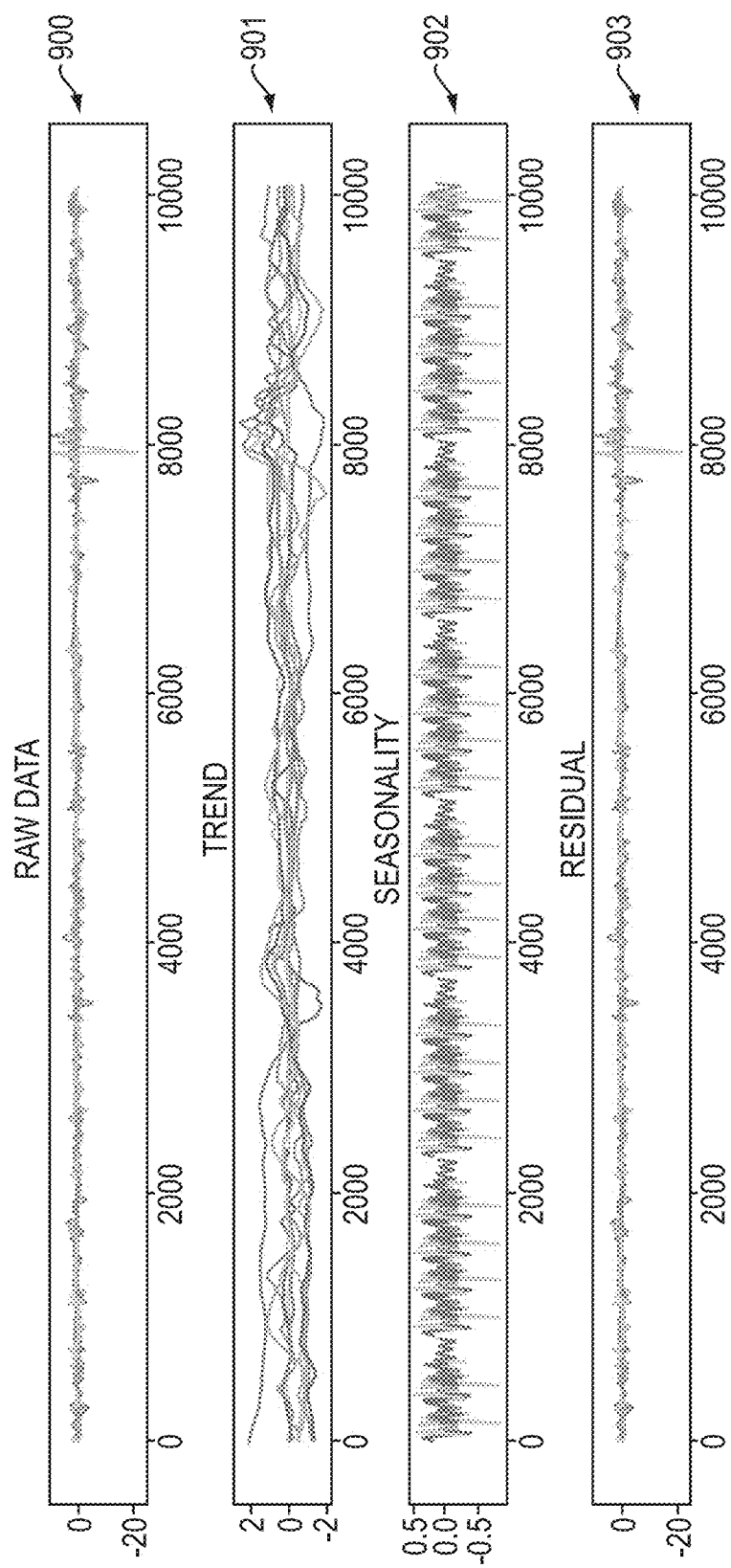
FIG. 9A is a set of graphs showing decomposition of raw sensor data into multiple components using seasonal and trend decomposition using Loess (STL) in trend analysis of embodiments.

FIG. 9A is a set of graphs 900-903 showing the decomposition of raw sensor data into multiple components using STL. FIG. 9A includes time series data from multiple sensors, each sensor identified in graphs 900-903 by a different color, with the recorded data expressed on the y-axis and the time the data was recorded expressed on the x-axis. The original data ($y_t$), shown in graph 900, can be expressed as function of a trend component ($T_t$), shown in graph 901, a seasonal component ($S_t$), shown in graph 902, and an irregular or remainder component ($I_t$), shown in graph 903. The original data 900 ($y_t$) can be a function the sum of the components, $y_t=T_t+S_t+I_t$, or a product of the components, $y_t=T_t*S_t*I_t$. The trend component of the data, shown in graph 901, can be used as the input for agent creation in step 603 of method 600, and/or training step 503 of method 500. The seasonal and residual components, shown in graphs 902 and 903 respectively, can be excluded from the inputs of agent creation in step 603 of method 600, and/or training step 503 of method 500. This enables only short-term trend ($T_t$) to be isolated and utilized without long term seasonal effects ($S_t$) or noise ($I_t$).

Figure 9B:
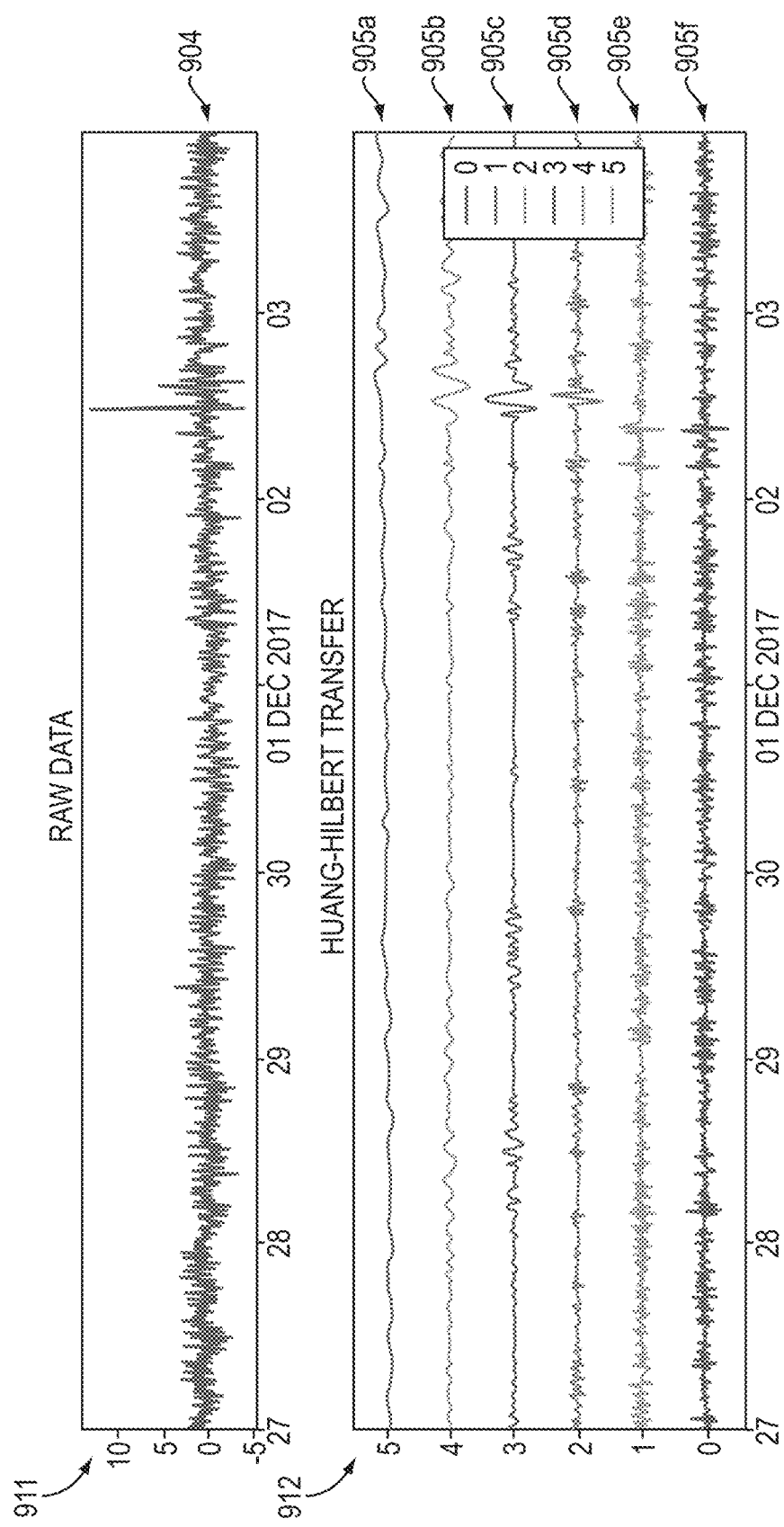
FIG. 9B is a graph showing decomposition of raw sensor data into multiple components using Hilbert-Huang transform (HHT) in trend analysis of embodiments.

Trend analysis 602e may alternatively apply Hilbert-Huang Transform (HHT) based signal decomposition. HHT decomposes the raw sensor data into intrinsic mode functions (IMF) along with a trend and obtained instantaneous frequency data. A IMF is a simple oscillatory function with the same number of extrema and zero crossings. By breaking the sensor data down into various IMF components, long term trends can be identified and corrected for and/or excluded. This allows for live data taken during a specific trend to be compared to the output of a predictive model trained with data taken during a different trend. FIG. 9B is a pair of graphs 911, 912 showing the decomposition of raw sensor data into multiple components using HHT. Raw data 904, displayed in graph 911, is decomposed into multiple intrinsic mode functions 905a-f, displayed in graph 912. Raw data 904 can then be expressed as a sum of the real parts of a Hilbert transform of the IMF functions 905a-f. The decomposed data 904 (X(t)) can be calculated using the following equation:

$$X(t) = Real \sum_{j=1}^{n} a_j(t) e^{i \int \omega_j(l) dt}.$$

where j is the number of the IMF component, a is the amplitude of the IMF component, and w is the frequency of the IMF component. Both the amplitude (a) and the frequency (w) of each IMF component can vary over time.

Using training and/or validation data, at least one intrinsic mode function of the IMF components 905a-f can be selected that best represents the occurrence of an anomaly, for example IMFs 905b and 905c. The best representative IMF may be identified by selecting the IMF component whose amplitude (a) magnitude best correlates with the anomaly. The selected IMFs can be used as the input for agent creation in step 603 of method 600, and/or training step 503 of method 500. This enables the decomposition of raw data 904 into component IMFs, e.g. 905b and 905c, that best identify the anomaly. By applying HHT, trend analysis 602e can extract the most relevant parts of raw data 904 to be used in training the machine learning components of embodiments of the invention. HHT also reduces noise by identifying and excluding the components of the raw data, e.g. IMFs 905e and 905f, that include the most variation unrelated to the anomaly.

Sensor spike 602f includes finding all local maxima of the data by a simple comparison of neighboring values. Optionally, a subset of these local maxima peaks can be selected by specifying conditions for a peak's properties. A peak or local maxima can be defined as any sample or data point whose two direct neighbors have a smaller amplitude. For flat peaks (more than one sample/data point of equal amplitude wide) the index of the middle sample can be identified as the local maxima or peak (rounded down in case the number of samples is even). Unusual or unexpected local maxima can be indications of poor or invalid data, caused for example by a disturbance of the monitored component, and excluded. Sensor spike 602f can also include determining the width of local maxima and using the width to determine if the local maxima was caused by a disturbance, and should be excluded from later analysis/training, or by an anomaly.

During data preparation step 602, 700, embodiments of the invention may also perform regime discovery. Regime discovery may be done using a Hierarchical Density-Based Spatial Clustering of Applications with Noise (HDBSCAN) clustering algorithm, Gaussian Mixture Modelling (GMM), a support-vector machine (SVM) or other similar data analysis technique or method. Regime discovery is used to identify non-actionable disturbances caused by interruptions by field engineers or automated control systems and/or as a pre-selection step to determine whether the sensor trend is slowly evolving or is composed of very distinct states. Regime discovery can also be used to select training data for three LSTM-based prediction detection model, by checking the separability of different identified regimes. For example, no-clear separation among the regimes infers better training data.

Figure 9C:
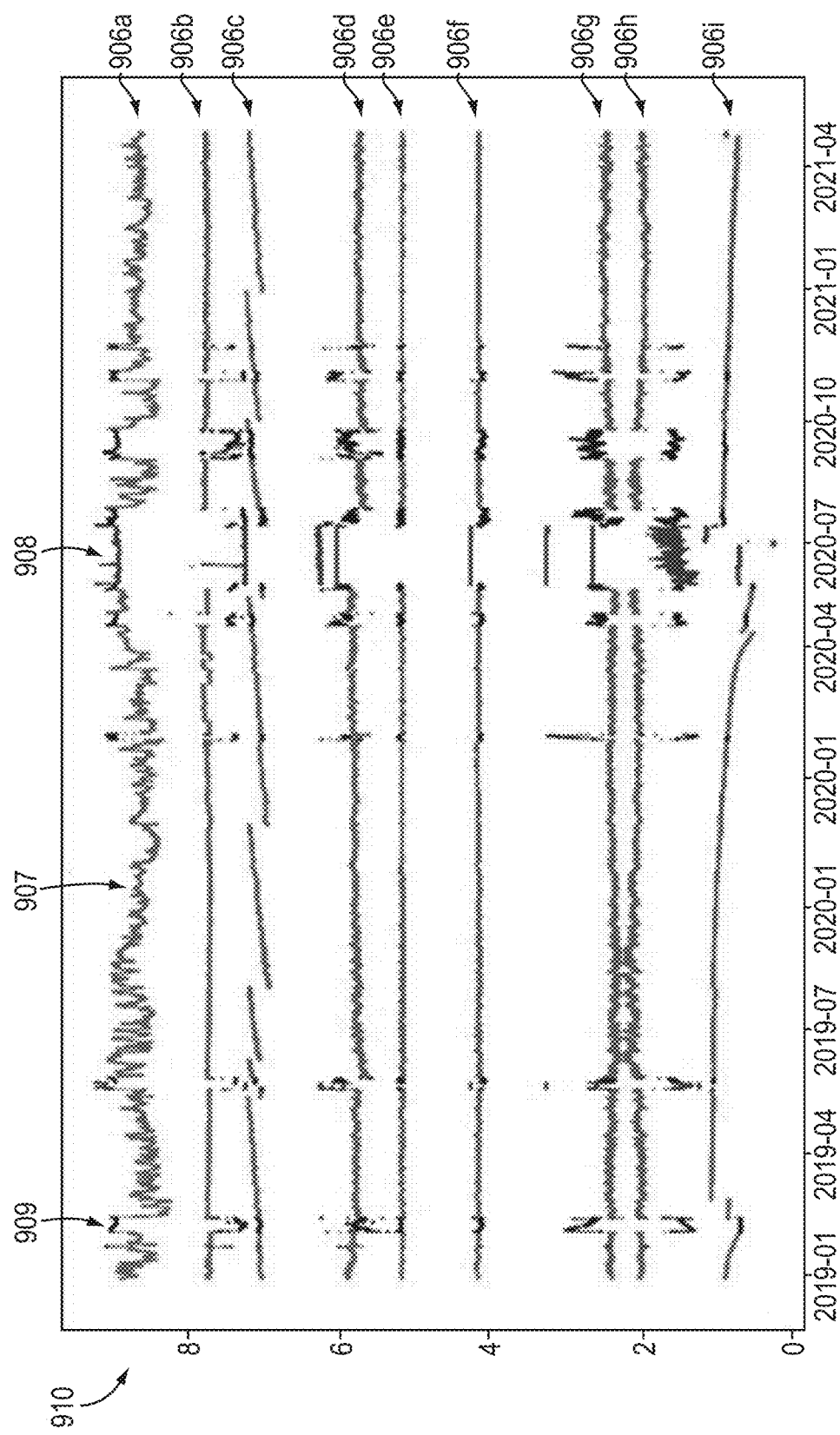
FIG. 9C is the output of a regime discovery process utilized by an embodiment of the invention.

FIG. 9C is the output of a regime discovery process performed by an embodiment of the invention. Graph 910 includes time series 906a-i, from multiple sensors with the recorded data expressed on the y-axis and the time the data was recorded expressed on the x-axis. Regime discovery, for non-limiting example performed using GMM, has identified three regimes 907 (shown in red), 908 ((shown in blue), and 909 (shown in black). The regime discovery process may also identify the type of each regime. For example, regime 907 is regular operation, regime 908 is when the component is offline, and regime 909 is during a component disruption. The regimes and their types can be outputted to a user. Abnormal regimes, e.g. 908 and 909, can be excluded from training or validation data sets and/or agent creation in step 603 of method 600, and/or training step 503 of method 500.

In some embodiments, the predictive model or agent of step 603 and/or the DAA agent 504 is created and trained by using LSTM, or alternative machine learning methods, to model a process behavior of a component in predicting KPI values under normal operation. This predicted KPI can be the output of a PID controller under normal operation. A PID controller's output, the manipulated variable (MV), is the sum of its three correcting terms, proportional, integral, and derivative that are comprised of other variables. Therefore, when provided with the values of a set of variables, received from sensors, as inputs, DAA agent 504, or the trained LSTM model is able to determine the value of the expected KPI. Once created and trained, the predictive model or agent 504, 603 is able to receive sensor data to predict the expected value of other variable(s), if the monitored component was operating normally. This can be accomplished in the same manner with which a PID controller can determine the value of the MV based on the value of variables that comprise the proportional, integral, and derivative terms. Therefore, the predictive model or agent 504, 603 is able to generate a comparison point to which the actual behavior of a component can be compared against.

FIG. 10 is a schematic diagram of a LSTM neural network architecture 1000 utilized by an embodiment of the invention. Neural network 1000 is composed of cells 1001a-t (collectively 1001). Each cell 1001a-t, manipulates input x with the goal of producing output y. The manner of manipulations is hidden and the neural network 1000 attempts to find the best combination of manipulations to transform x into y. The LSTM neural network 1000 includes an input gate, an output gate, and a forget gate that regulate the flow of information into and out of the cells 1001a-t. Each cell 1001, includes an input 1002, that receives data, x. The cells 1001 include a hidden layer 1003 that calculates h by manipulating the input in an unknown manner. The hidden layer 1003 of each cell 1001 may also use the value h calculated by the previous cell as a second input to calculate its h value. For example, cell 1001b uses $x_1$ and $h_0$ to calculate $h_1$. How the hidden layer 1003 of each cell 1001 calculates his trained using the training data. The final cell, 1001t, will output its calculated $h_t$, as the output y, 1004. The neural network 1000 also uses weights (W) 1005 and units (U) 1006. The weights (W) 1005 act as a multiplicative modified for inputs x for the calculation of h by the hidden layer 1003. The units (U) 1006 act as a multiplicative modified for inputs of $h_{n-1}$ of the previous cell 1001n-1 for the calculation of $h_n$ by the hidden layer 1003 of cell 1001n. The values of weights (W) 1005 and units (U) 1006 are also trained using the training data.

The neural network 1000 uses training data, with already know x values and y values to attempt to find the best set of manipulations performed sequentially by cells 1001a-t to transform x into y. After neural network 1000 is trained, it can apply the determined best set of manipulations performed sequentially by cells 1001a-t on an inputted value x to generate a predicted value y, even when value y is unknown. For example, one or more variables monitored by sensors during a normal operation time period can be used as inputs, x, of the neural network 1000. One or more other variables monitored by sensors during the same normal operation time period can be provided to the neural network

1000 as an output y. The neural network will then determine the best set of manipulations performed sequentially by cells 1001a-t and the values of weights (W) 1005 and units (U) 1006 to transform the variable values provided as inputs, x, into the variable values provided as outputs, y. Collectively these manipulations should define a dependency between the input variable values and the output variable values that are able to transform input variable values into output variable values, even if the output variable is unknown. This correlation assumes normal component operation and if the manipulations do not transform input variables into the output variables that match the actual data collected, it is likely the monitored component has entered a period of abnormal operation.

Figure 11:
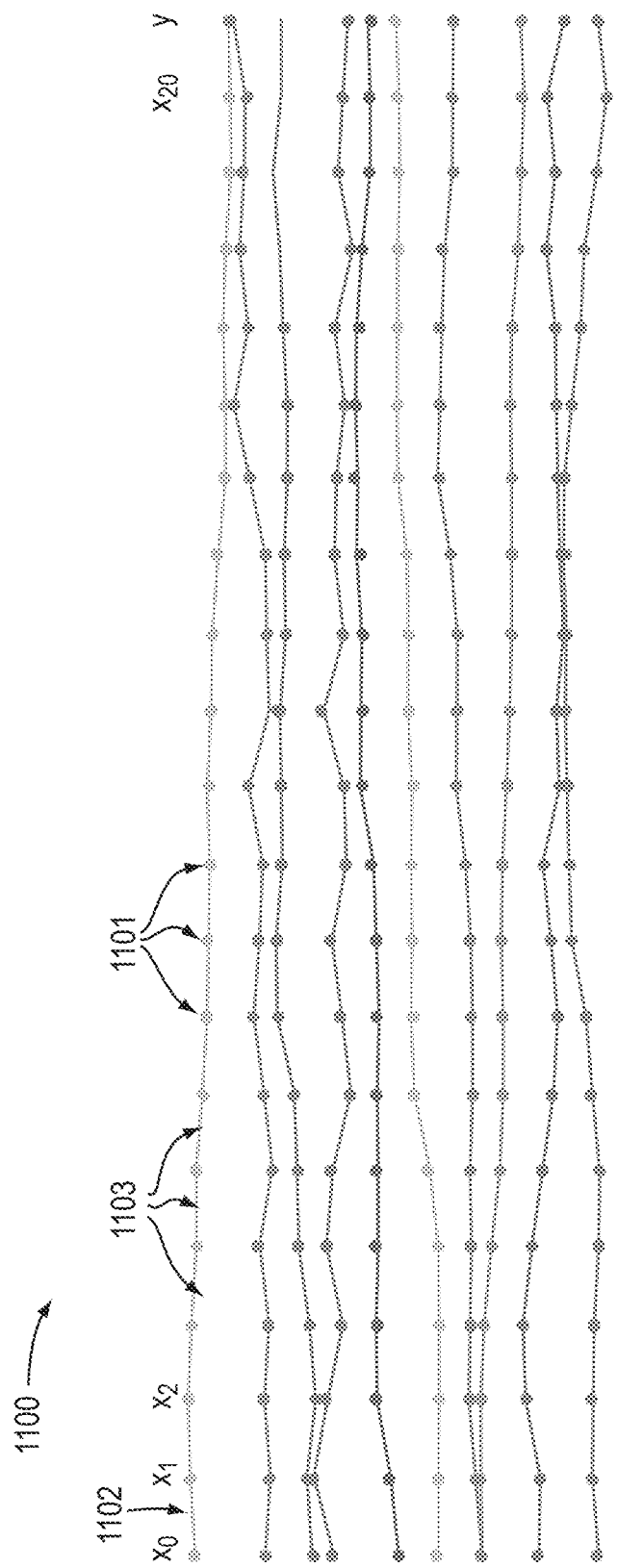
FIG. 11 illustrates an example of application of a neural network to determine the value of dependent variable y from values of variable x as employed in embodiments.

FIG. 11 is an example of the application of a neural network, e.g., 1000 described hereinabove in relation to FIG. 10, being applied to determine the value of independent variable y values from variable x values. Graph 1100 shows the transformation of variable x into variable y with the use of a neural network. Each node 1101, represents a new value for variable x ($x_0, x_1, x_2, \ldots x_{20}$) after a transformation 1103 applied by the cells, e.g., 1001 of the neural network, e.g., 1000. Line 1102 shows the change of variable x value across twenty nodes of the neural network until it is transformed into the variable y value. Graph 1100 also displays other input variables' values that are also transformed into other output variables by neural network 1000 and the transformations 1103 applied by cells 1001. Once trained, live data (plant sensor readings or measurements) can be used as the input for neural network 1000 which will be able to predict other variables' values in real time.

Figure 12A:
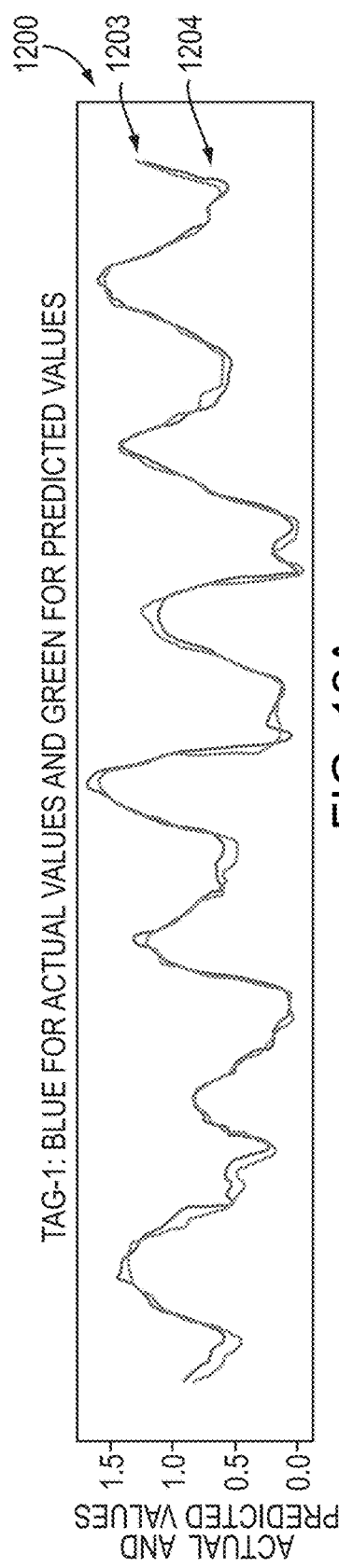
FIG. 12A is a graph comparing actual values and predicted values of a monitored variable, where the predicted values were determined using an embodiment of the invention.

In the analysis of anomalies, embodiments compare the model 504, 603 prediction output with real time actual sensor readings or measurements of interest as mentioned above at steps 508, 604 of FIGS. 5 and 6. Techniques for such comparison are discussed next. FIG. 12A is a graph 1200 comparing the actual values 1203 and predicted values 1204 of a monitored variable. Graph 1200 is an example output of embodiments of the inventions described herein for identifying anomalies. Graph 1200 shows a tag, i.e., the output of a single sensor. The sensor output is displayed as a time series in the graph 1200 with the values of the monitored parameter on they axis and the time of measurement on the x axis. Graph 1200 displays the actual values 1203 measured by the sensor and the predicted values 1204 generated by the predictive model 504. Because the actual values 1203 and predicted values 1204 are similar throughout the graphed time period, it is highly likely that the actual values were measured during a period of normal operation.

Figure 12B:
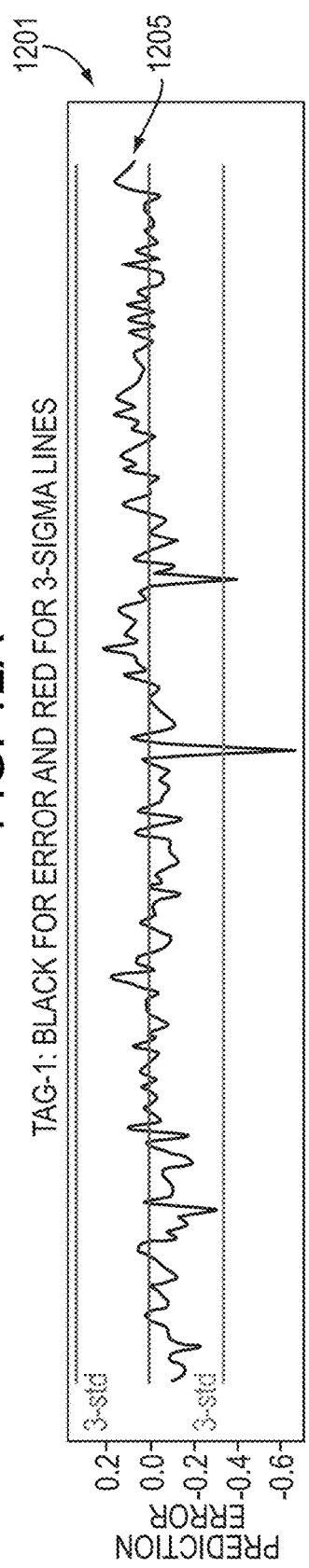
FIG. 12B is a graph of the difference between the actual values and predicted values of a monitored variable as displayed in FIG. 12A.

FIG. 12B is a graph 1201 of the difference 1205 between the actual values 1203 and predicted values 1204 of the monitored variable displayed in FIG. 12A. Embodiments of the invention may also output a graph 1201 that displays the magnitude of the difference 1205 between the actual values 1203 and predicted values 1204. The magnitude of the difference 1205 may be utilized by an algorithm, including a learning machine, to determine whether the actual values were measured during a period of normal state or a period of anomalous operation. Embodiments of the invention, as shown in the plot 1201 may include standard deviation sigma lines that establish thresholds for deviation magnitudes. Since the difference 1205 is relatively minor for most of the shown time, graph 1201 supports the determination that it is highly likely that the actual values 1203 were measured during a period of normal operation.

Figure 12C:
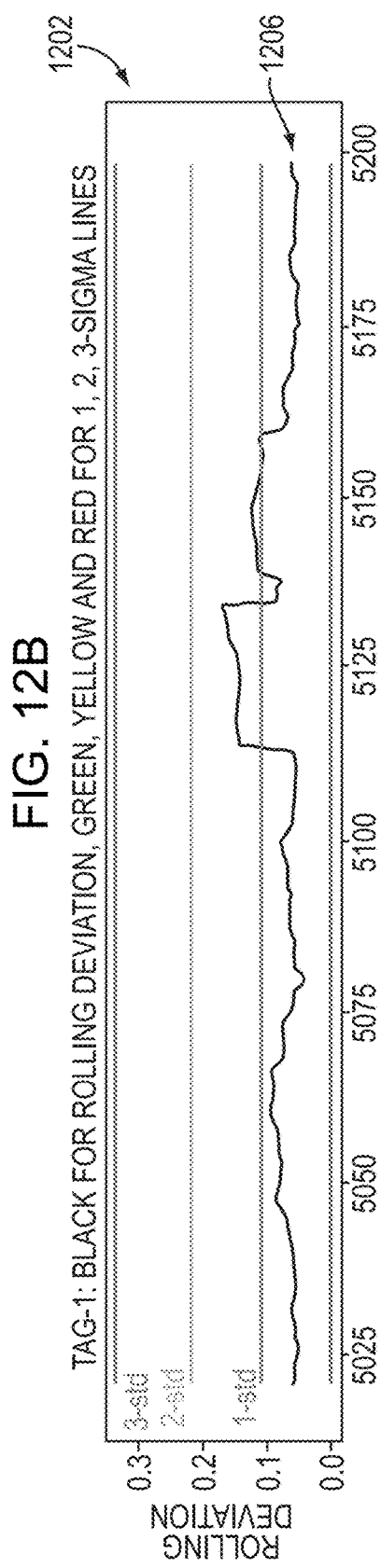
FIG. 12C is a graph of the rolling deviation between the actual values and predicted values of a monitored variable as displayed in FIG. 12A.

FIG. 12C is a graph 1202 of the rolling deviation 1206 between the actual values 1203 and predicted values 1204 of the monitored variable displayed in FIG. 12A. Embodiments of the invention may also output a graph 1202 that displays the rolling deviation 1206. The rolling deviation 1206 may be utilized by an algorithm, including a learning machine, to determine if the actual values 1203 were measured during a period of normal or a period of anomalous operation. Embodiments of the invention, as shown in the graph 1202, may include standard deviation sigma lines (1-std, 2-std, and 3-std) that establish thresholds for rolling deviation magnitudes. Since the rolling deviation 1206 remains small for most of the shown time, graph 1202 supports the determination that it is highly likely that the actual values were measured during a period of normal operation.

FIG. 13A is a graph 1301 comparing the actual values 1303 and predicted values 1304 of a monitored variable that includes a period 1307 of abnormal operation. FIG. 13B is a graph 1302 of the difference 1305 between the actual values 1303 and predicted values 1304 of the monitored variable displayed in FIG. 13A. FIG. 13C is a graph 1303 of the rolling deviation 1306 between the actual values 1303 and predicted values 1304 of the monitored variable displayed in FIG. 13A. FIGS. 13A-C are similar to FIGS. 12A-C except they include a period 1307 of chaotic operation where the predicted values 1304 deviate significantly from the actual values 1303. Graphs 1301, 1302, and 1303 clearly capture and show this period 1307 of chaotic operation. Specifically, in graphs 1302 and 1303 the deviation 1305 and rolling deviation 1306 significantly exceed the established sigma lines. Embodiments of the invention can use the deviation 1305 and rolling deviation 1306, including their magnitude, rate of change, and other properties to identify period 1307 as an anomalous operation period. Embodiments of the invention may also utilize other tags or monitored variables to identify which tags or monitored variables contributed, and the percentage of their contribution, to the detected period 1307 of anomalous operation. In this way, such an embodiment identifies the monitored variables that experienced the most abnormal values and behavior, and in turn the embodiment identifies the corresponding sensors that measured said variable values of the most abnormal behavior. Embodiments of the invention may also determine the probability that period 1307 of chaotic operation is a period of anomalous operation.

Figure 14A:
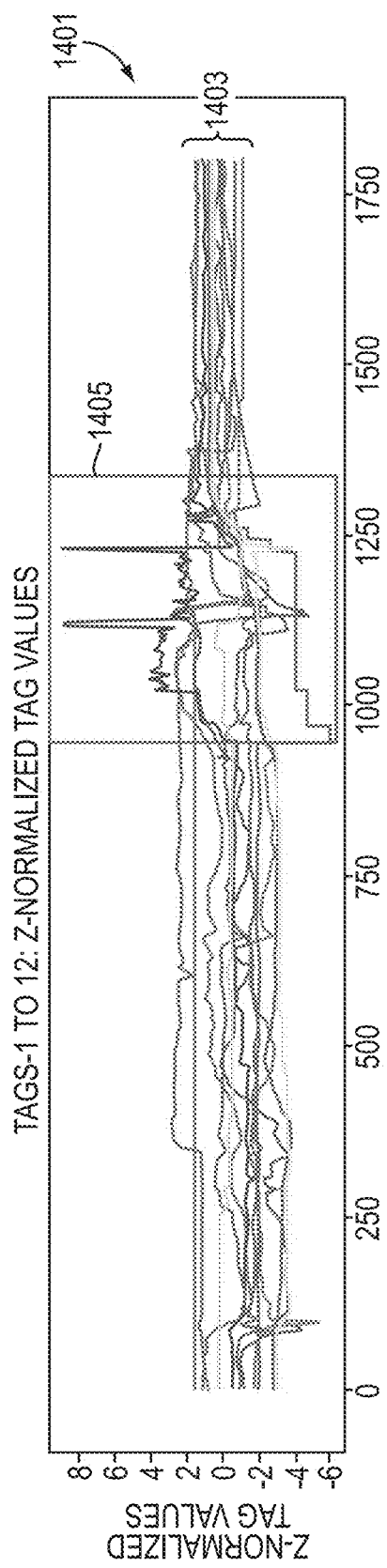
FIG. 14A is a graph of the normalized actual values of twelve monitored variables in an embodiment.
Figure 14B:
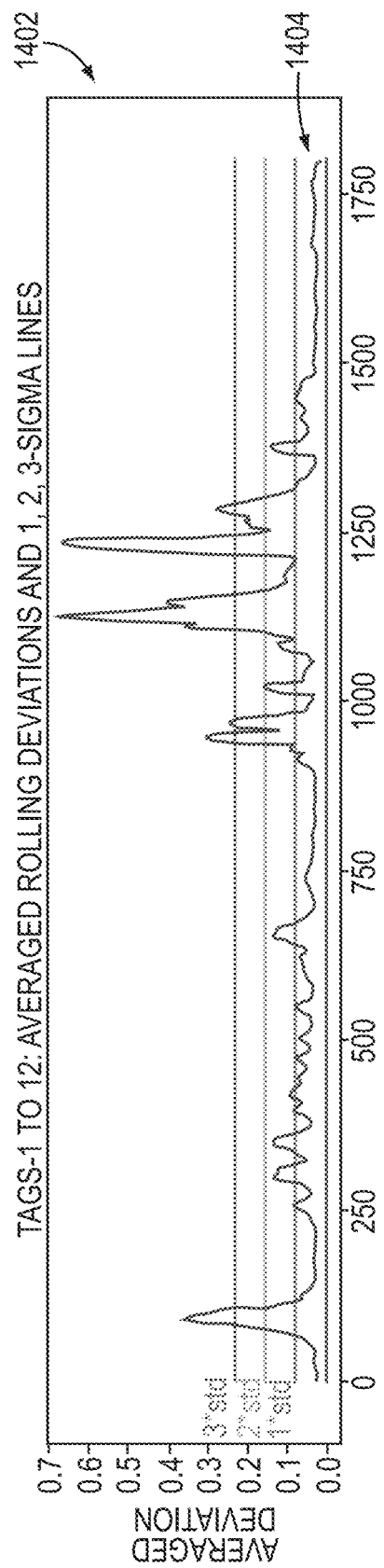
FIG. 14B is a graph of the averaged rolling deviation between predicted values and the actual values of the monitored variables as displayed in FIG. 14A.

FIG. 14A is a graph 1401 of the normalized actual values 1403 of twelve monitored variables. Embodiments can analyze multiple tags or variables. Graph 1401 displays time series of twelve monitored variables collected by sensors of plant 150. The displayed time series may be part of live data 505. FIG. 14B is the graph 1402 of the averaged rolling deviation 1404 from the predicted values (not shown) of the actual values 1403 of the monitored variables displayed in FIG. 14A. Embodiments of the invention may average deviations and rolling deviations of multiple monitored variables to improve efficiency and/or simplify an output. The averaged deviations and rolling deviations may be utilized to identify periods of anomalous operation based on the actual values 1403 of multiple variables. The averaged deviations and rolling deviations may be compared to standard deviation sigma lines as shown in graph 1402. Both graphs 1401 and 1402 clearly show a period 1405 of high volatility and deviation from the predicted values. This period 1405 can be identified as a period of anomalous operation.

Figure 15A:
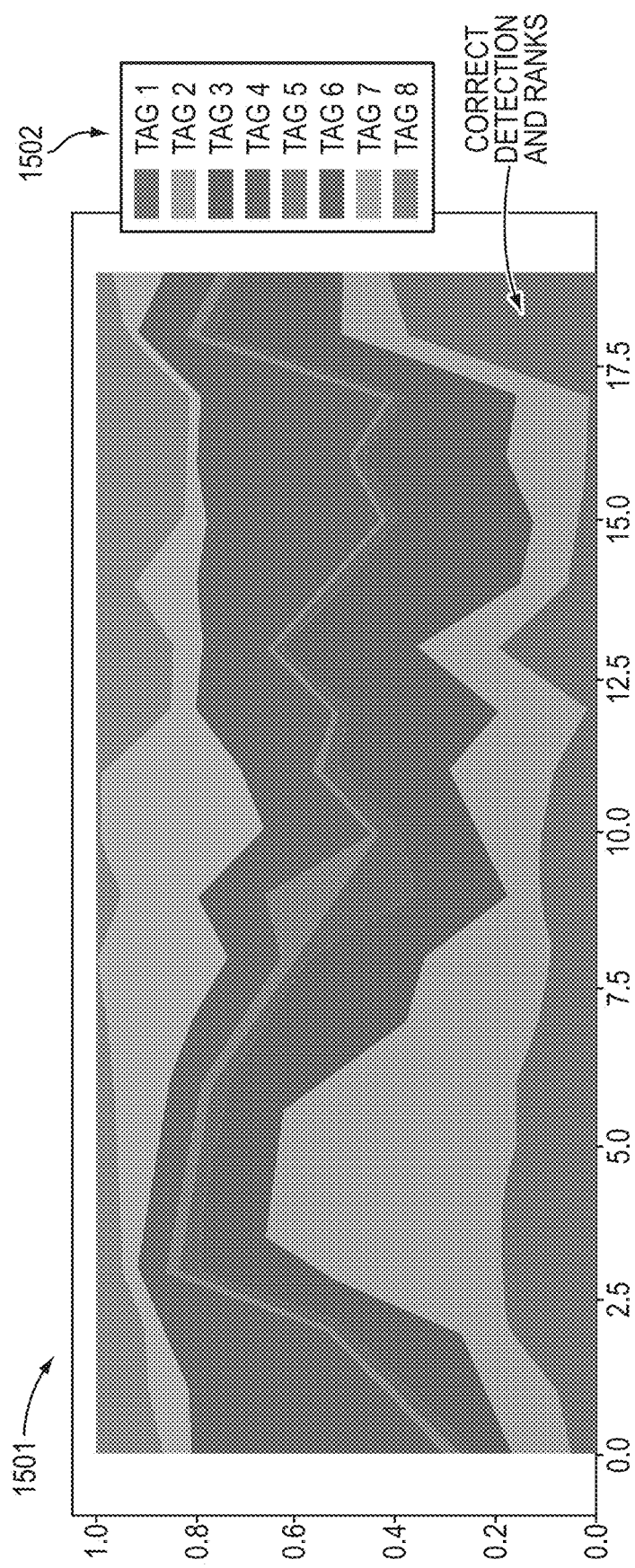
Figure 15D:
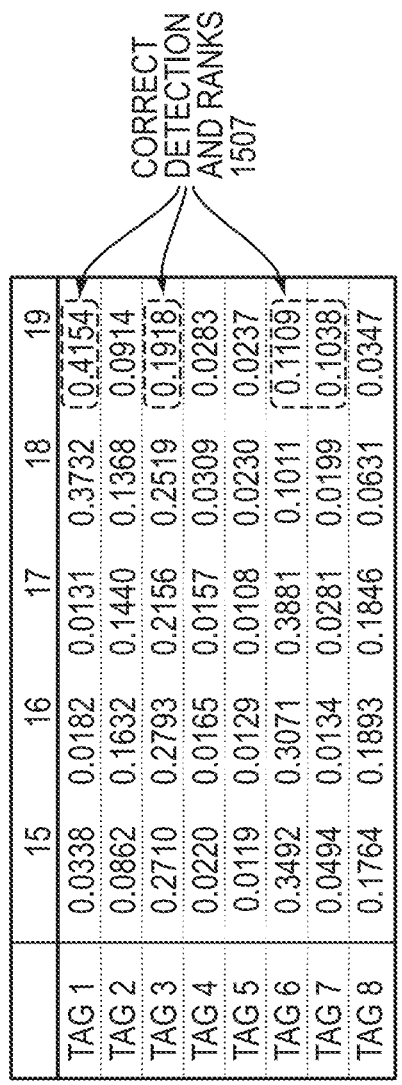

Graphs 1200, 1201, 1202, 1301, 1302, 1303, 1401, and 1402 may be provided to users as an output at application servers 101a, 101b, . . . 101n. The output of embodiments may also include a determination that a period corresponds to a period of anomalous operation. The output may further include a determination of the probability that a period corresponds to a period of anomalous operation and/or the contribution from each sensor 106, 107, 109A-1 to the determination that a period corresponds to a period of anomalous operation FIGS. 15A-15D schematically illustrate, for non-limiting example, screen views or pertinent parts thereof in a user interface in an embodiment. Displayed in a screen view, the graph 1501 of FIG. 15A shows multiple monitored variables (Tags 1-8) and their contribution to a detected anomaly. Each monitored variable is shown on key 1502 and represented by a different color in graph 1501. In the same screen view of FIG. 15A or other screen views FIGS. 15B and 15C, the user interface displays graphs 1503 and 1504 of the sensor data for the monitored variables shown in FIG. 15A. The detected period of anomalous operation 1506 (shaded band) corresponds to the time period of graph 1501. The screen view of FIG. 15D includes a table 1505 of the calculated variable (Tags 1-8) values 1507 of the contribution to the detected anomaly shown in FIG. 15A. FIGS. 15A-D show that the variable with the tag "TAG 1" had the most contribution to the detected anomaly. For non-limiting example, Tag 1 could be a monitored variable corresponding to an oil reservoir level. This information can assist plant engineers with solving, fixing, and/or avoiding the anomaly. Such anomaly detection by time period and ranked contributing factor (tag name of variable or parameter that is monitored and measured by specific corresponding one or more sensors) is heretofore unachieved by the prior art.

Digital Processing Environment

Figure 16:
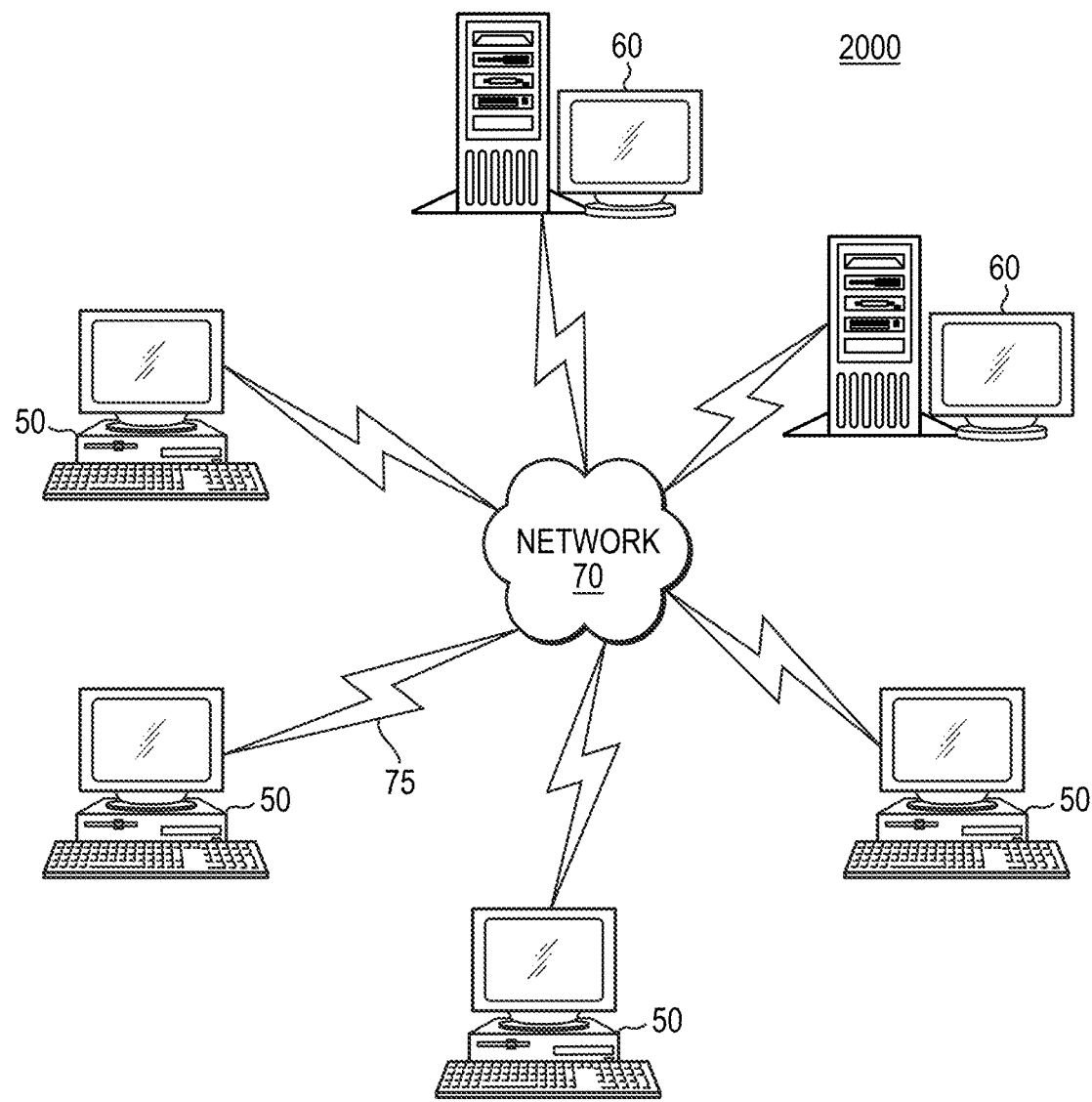
FIG. 16 is a schematic view of a computer network or similar digital processing environment in which the embodiments of the present invention may be implemented.

FIG. 16 illustrates a computer network or similar digital processing environment in which the present embodiments 2000 may be implemented. Client computer(s)/devices 50 and server computer(s) 60 provide processing, storage, and input/output devices executing application programs and the like. Client computer(s)/devices 50 and server computer(s) 60 may be parts of system 100 such as application servers 101a, 101b, 101n, data server 103, database 111 and/or distributed control system 104. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 17:
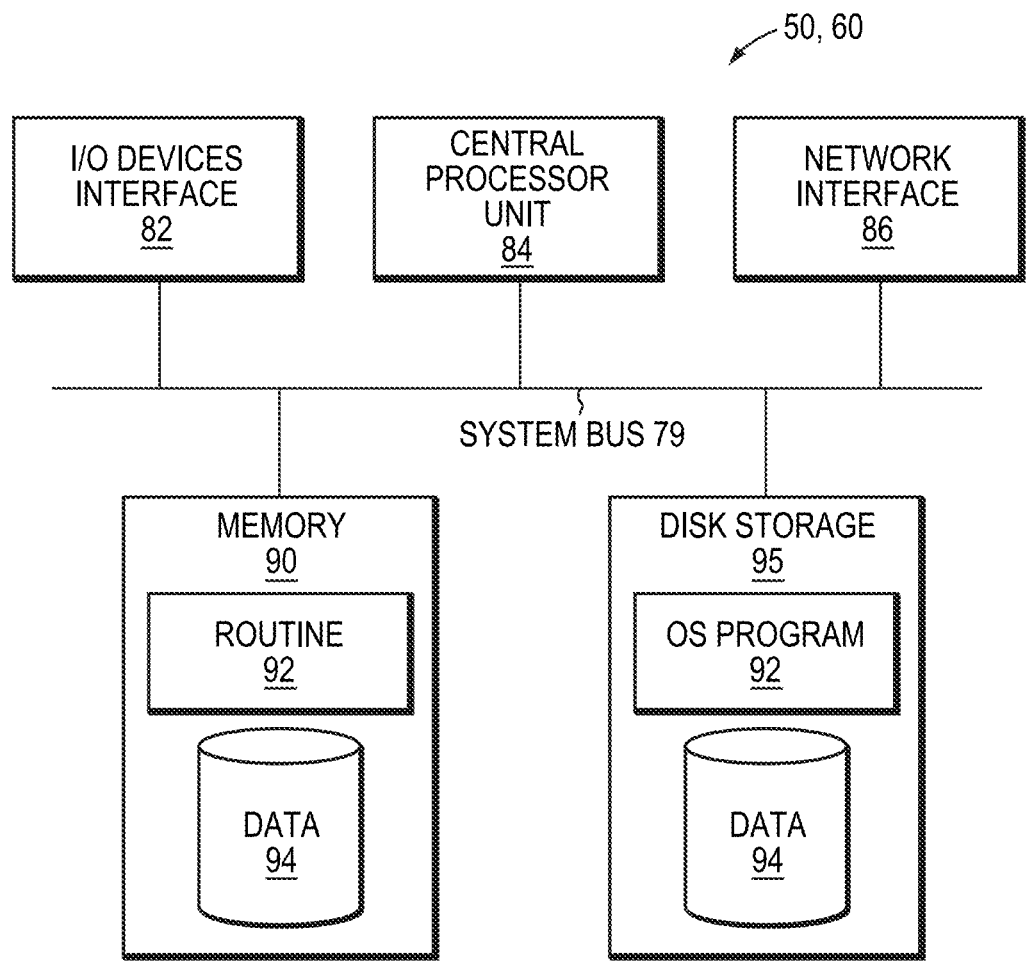
FIG. 17 is a block diagram of the internal structure of a computer (e.g., client processor/device or server computers) in the computer network of FIG. 16.

FIG. 17 is a diagram of the internal structure of a computer (e.g., client processor/device 50 or server computers 60) in the computer system of FIG. 16. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, and network ports) that enables the transfer of information between the elements. Attached to system bus 79 is I/O device interface 82 for connecting various input and output devices (e.g., keyboard, mouse, displays, printers, and speakers) to the computer 50, 60. Network interface 86 allows the computer to connect to various other devices attached to a network (e.g., network 70 of FIG. 16). Memory 90 provides volatile storage for computer software instructions 92 and data 94 used to implement embodiments of the invention (e.g. methods 400, 500, 600, 700, supporting machine learning models, the associated algorithms, outputs, and user interface displays detailed above). Disk storage 95 provides non-volatile storage for computer software instructions 92 and data 94 used to implement many embodiments. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, and tapes) that provides at least a portion of the software instructions for the system. Computer program product 92 can be installed by any suitable software installation procedure, as is well known in the art. In another embodiment, at least a portion of the software instructions may also be downloaded over a cable, communication and/or wireless connection. In other embodiments, the programs are a computer program propagated signal product 75 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product. Generally speaking, the term "carrier medium" or transient carrier encompasses the foregoing transient signals, propagated signals, propagated medium, storage medium and the like. In other embodiments, the program product 92 may be implemented as a so-called Software as a Service (SaaS), or other installation or communication supporting end-users.

Embodiments of the invention may be implemented on a mixed public and private structure to improve security and execution. For non-limiting example, the training workflow 400 can be performed on a powerful computing device or combination of computing devices, e.g. servers 60, publicly accessible via network 70. In addition, steps 602 (data preparation) and 603 (agent creation by machine learning) of method 600 can also be performed on a powerful computing device or combination of computing devices, e.g. servers 60, publicly accessible via network 70. The computing device(s) used for training and creating the predictive model can be made available to users on a webserver. This enables the processing intensive agent training steps of embodiments of the invention to be performed on powerful devices with more computing capabilities. In addition, dedicated and often expensive devices configured to perform the agent training steps of embodiments of the invention can be shared between multiple users. The computing devices may be configured to be able to perform containerized training workflows that create and train multiple predictive models in parallel.

After a predictive model is created and trained it can be encrypted with a public key after serialization with distributed services that are released to users. The distributed services include a private key that can be used to decode the trained model and use the decoded trained model to predict data, e.g. step 604 of method 600. Private computers such as smart devices with variable computing capabilities, e.g. computer systems 50, can use the distributed private key to access the trained model and generate predictions based on live data. This allows the prediction to be performed on devices with variable computing capabilities by on-premises plant computers, cloud resources, or edge devices that may be unable to perform the agent training and creation steps of the disclosed inventions.

Both the private key, or other method for decrypting the publicly accessible encrypted trained model can be included with a software product used to execute the trained model to generate predictions and detect anomalies. This enables simpler model deployment. Moreover, including the private key in the software product also enables cross operating system and language uses, and enables platform transformation. For example, the model can be created and trained on one public computer system using an operating system and language optimized for machine learning applications and data processing. Meanwhile predictions can be performed by a different private computer system that uses an operating system and language optimized for end-user ease of use. The distributed services can include programs and/or other software configured to interface with the trained model regardless of any differences between the computer device training and creating the model and the computer device executing the trained model to generate predictions.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented predictive method for identifying an anomalous state of a component in a real-world environment, the method comprising:
   receiving data from at least one sensor of a component in a real-world environment;
   executing a machine learning model to calculate, using the received data from the at least one sensor of the component in the real-world environment, a predicted normal behavior of the component at a future time;
   at or after the future time, computing a divergence based on a difference between an actual behavior of the component at the future time and the predicted normal behavior of the component at the future time; and
   determining, using a statistic learning method, and indicating if the component in the real-world environment is in an anomalous state based upon (i) a scale of the divergence and (ii) a variation of the divergence.

2. The method of claim 1 further comprising:
   accessing historic operating data of the component in the real-world environment; and
   training the machine learning model using the accessed historic operating data to predict one or more normal behaviors of the component at one or more future times based on the data from the at least one sensor of the component in the real-world environment.

3. The method of claim 2 wherein the accessed historic operating data includes at least one of: data of the component in the real-world environment operating in a normal state and data of the component in the real-world environment operating in an anomalous state.

4. The method of claim 1 wherein the machine learning model is a LSTM recurrent neural network.

5. The method of claim 1 further comprising preprocessing the received data based upon at least one of oscillations, seasonal trends, correlations, and historical anomalous states of the component in the real-world environment.

6. The method of claim 1 wherein the statistic learning method is a gaussian mixture model.

7. The method of claim 1 wherein the actual behavior of the component is real time information.

8. The method of claim 1 further comprising determining and indicating a contribution score for the at least one sensor of the component in the real-world environment, the contribution score measuring a contribution to the divergence.

9. The method of claim 1 further comprising determining and indicating a confidence in the determination if the component in the real-world environment is in the anomalous state based upon i) the scale of divergence and ii) the variation of the divergence.

10. The method of claim 1 wherein the predicted normal behavior of the component at the future time is a predicted value of a manipulated variable of a proportional-integral-derivative controller of the component and the actual behavior of the component is an actual value of the manipulated variable of the proportional-integral-derivative controller of the component.

11. A computer-based system for identifying an anomalous state of a component in a real-world environment, the system comprising:
    a processor; and
    a memory with computer code instructions stored thereon, the processor and the memory, with the computer code instructions being configured to cause the system to:
    receive data from at least one sensor of a component in a real-world environment;
    execute a machine learning model to calculate, using the received data from the at least one sensor of the component in the real-world environment, a predicted normal behavior of the component at a future time;
    at or after the future time, compute a divergence based on a difference between an actual behavior of the component at the future time and the predicted normal behavior of the component at the future time; and
    determine, using a statistic learning method, and indicate if the component in the real-world environment is in an anomalous state based upon (i) a scale of the divergence and (ii) a variation of the divergence.

12. The system of claim 11 wherein, the processor and the memory, with the computer code instructions, are further configured to cause the system to:
    access historic operating data of the component in the real-world environment; and
    train the machine learning model using the accessed historic operating data to predict one or more normal behaviors of the component at one or more future times based on the data from the at least one sensor of the component in the real-world environment.

13. The system of claim 12 wherein, in training the machine learning model, the processor and the memory, with the computer code instructions, are further configured to cause the system to:

interface, via a network, with one or more computing devices to perform the training.

14. The system of claim 12 wherein the accessed historic operating data includes at least one of: data of the component in the real-world environment operating in a normal state and data of the component in the real-world environment operating in an anomalous state.

15. The system of claim 11 wherein, the processor and the memory, with the computer code instructions, are further configured to cause the system to:

encrypt the machine learning model with a public key; and decrypt the machine learning model with a private key.

16. The system of claim 11 wherein the machine learning model is a LSTM recurrent neural network.

17. The system of claim 11 wherein, the processor and the memory, with the computer code instructions, are further configured to cause the system to:

preprocess the received data based upon at least one of oscillations, seasonal trends, correlations, and historical anomalous states of the component in the real-world environment.

18. The system of claim 11 wherein the statistic learning method is a gaussian mixture model.

19. The system of claim 11 wherein the predicted normal behavior of the component at the future time is a predicted value of a manipulated variable of a proportional-integral-derivative controller of the component and the actual behavior of the component is an actual value of the manipulated variable calculated by the proportional-integral-derivative controller of the component.

20. A computer program product for identifying an anomalous state of a component in a real-world environment, the computer program product comprising:

one or more non-transitory computer-readable storage devices and program instructions stored on at least one of the one or more non-transitory computer-readable storage devices, the program instructions, when loaded and executed by a processor, cause an apparatus associated with the processor to:

receive data from at least one sensor of a component in a real-world environment;

execute a machine learning model to calculate, using the received data from the at least one sensor of the component in the real-world environment, a predicted normal behavior of the component at a future time;

at or after the future time, compute a divergence based on a difference between an actual behavior of the component at the future time and the predicted normal behavior of the component at the future time; and determine, using a statistic learning method, and indicate if the component in the real-world environment is in an anomalous state based upon (i) a scale of the divergence and (ii) a variation of the divergence.

* * * * *